United States Patent [19]
Fijioka et al.

[11] Patent Number: 5,545,929
[45] Date of Patent: Aug. 13, 1996

[54] ANTISKID CONTROL DEVICE

[75] Inventors: Hideaki Fijioka; Kazumi Yasuzumi, both of Itami, Japan

[73] Assignee: Sumitomo Electric Industries, Ltd., Osaka, Japan

[21] Appl. No.: 552,772

[22] Filed: Nov. 3, 1995

[30] Foreign Application Priority Data

Nov. 16, 1994 [JP] Japan ..................... 6-281833

[51] Int. Cl.$^6$ ....................... B60T 8/60
[52] U.S. Cl. ............. 303/166; 303/167; 303/174; 303/113.4; 303/DIG. 4; 303/DIG. 1
[58] Field of Search .................. 303/166, 174, 303/DIG. 1, DIG. 2, DIG. 3, DIG. 4, 121, 155, 160, 161, 154, 163, 164, 165, 167, 113.4; 364/426.01, 426.02, 426.03; 188/181 C, 181 A

[56] References Cited

U.S. PATENT DOCUMENTS

| | | | |
|---|---|---|---|
| 4,916,698 | 4/1990 | McCann . | |
| 4,950,037 | 8/1990 | Kopper et al. | 303/166 |
| 5,051,907 | 9/1991 | Kuwana et al. | 303/161 |
| 5,150,298 | 9/1992 | Fujioka et al. | 303/166 |
| 5,193,887 | 3/1993 | Bleckmann et al. . | |
| 5,242,216 | 9/1993 | Miyawaki et al. | 303/167 |
| 5,368,374 | 11/1994 | Fujimoto . | |
| 5,403,075 | 4/1995 | Fujioka | 303/166 |
| 5,460,199 | 10/1995 | Takata et al. . | |

FOREIGN PATENT DOCUMENTS

| | | |
|---|---|---|
| 525574 | 2/1993 | European Pat. Off. . |
| 2171377 | 7/1990 | Japan . |
| 3-92463 | 4/1991 | Japan . |
| 5246317 | 9/1993 | Japan . |
| 2241123 | 8/1991 | United Kingdom . |
| 90/03602 | 4/1990 | WIPO . |

OTHER PUBLICATIONS

European Search Report And Annex. (no date).

*Primary Examiner*—Douglas C. Butler
*Attorney, Agent, or Firm*—Greenblum & Bernstein P.L.C.

[57] ABSTRACT

An antiskid control device which calculates an estimated fluid pressure of each of wheel cylinders under antiskid control in each control cycle so as to adjust a fluid pressure of each of the wheel cylinders on the basis of the estimated fluid pressure and behaviors of the wheels. The device includes a differential pressure detecting member which detects a difference between a fluid pressure of a master cylinder and the fluid pressure of each of the wheel cylinders so as to produce an output signal indicative of the difference between the fluid pressure of the master cylinder and the fluid pressure of each of the wheel cylinders. When the difference between the fluid pressure of the master cylinder and the fluid pressure of each of the wheel cylinders is found to be in the vicinity of zero, the estimated fluid pressure of each of the wheel cylinders is set to a predetermined value by stopping addition in calculation of the estimated fluid pressure.

7 Claims, 18 Drawing Sheets

ANTISKID CONTROL DEVICE

BACKGROUND OF THE INVENTION

The present invention generally relates to antiskid control devices for preventing the skid of wheels of a motor vehicle and more particularly, to/an antiskid control device for preventing occurrence of a phenomenon that, when estimated brake fluid pressures of wheel cylinders increase extremely according to a driver's force for stepping on a brake pedal, proper antiskid control is not performed, thereby resulting in instability of a vehicle body.

Generally, in prior art antiskid control devices, the skid state of wheels is detected from the amount of drop of wheel speeds relative to the vehicle body speed, and wheel acceleration or deceleration and brake fluid pressure is controlled to a proper level in accordance with the skid state. Thus, since the skid of the wheels is maintained at a proper level, i.e., a region where the coefficient of friction of a road surface comes close to its peak, braking distance is reduced and excellent driving stability of a vehicle body is secured.

However, if only behaviors of the wheels and the vehicle body are considered for control of brake fluid pressure through its increase or reduction, a problem may arise in that brake fluid pressure becomes insufficient due to excessive reduction of brake fluid pressure or due to improper increase of brake fluid pressure after excessive reduction of brake fluid pressure.

Meanwhile, in order to control brake fluid pressure, on-off type solenoid controlled valves have been generally employed to increase and decrease brake fluid pressures in wheel cylinders. In this case, since increase and reduction characteristics of brake fluid pressure change according to brake fluid pressure in a master cylinder or each wheel cylinder, the above mentioned problem may be encountered if accurate brake fluid pressure is not grasped.

In order to solve this problem, Japanese Patent Laid-Open Publication Nos. 2-171377 (1990) and 3-92463 (1991) disclose that an actuator having a servo function is used for directly controlling brake fluid pressure. However, since this actuator is expensive, the actuator is not desirable in view of its cost.

Thus, Japanese Patent Laid-Open Publication No. 5-246317 (1993) discloses a technique in which brake fluid pressure in each wheel cylinder during antiskid control is estimated by using an actuator having a general on-off type solenoid controlled valve so as to control brake fluid pressure. However, in this known technique, estimated brake fluid pressure and the brake fluid pressure in each wheel cylinder changes as shown in FIG. 1 in a case where a driver steps on a brake pedal strongly so as to perform antiskid control. On the other hand, when the driver steps on the brake pedal so lightly as to possibly cause antiskid control on a road surface on which his motor vehicle is running, brake fluid pressure in the master cylinder is low as shown in FIG. 2. Therefore, actual brake fluid pressure in each wheel cylinder does not rise so high as to initiate a brake fluid pressure increasing command given to the solenoid controlled valve, so that estimated brake fluid pressure becomes excessively large and a pressure reducing command leads to a small brake fluid pressure reducing value suitable for a road surface having a higher coefficient of friction, thereby resulting in instability of the vehicle body.

SUMMARY OF THE INVENTION

Accordingly, an essential object of the present invention is to provide an antiskid control device which eliminates the above mentioned drawbacks of conventional antiskid control devices.

In order to accomplish the objects of the present invention, an antiskid control device which calculates an estimated fluid pressure of each of wheel cylinders under antiskid control in each control cycle is provided, so as to adjust a fluid pressure of each of the wheel cylinders on the basis of the estimated fluid pressure and behaviors of wheels, comprising: a differential pressure detecting means which detects a difference between a fluid pressure of a master cylinder and the fluid pressure of each of the wheel cylinders so as to produce an output signal indicative of the difference between the fluid pressure of the master cylinder and the fluid pressure of each of the wheel cylinders; wherein when on the basis of the output signal of the differential pressure detecting means, the difference between the fluid pressure of the master cylinder and the fluid pressure of each of the wheel cylinders is found to be in the vicinity of zero, the estimated fluid pressure of each of the wheel cylinders is set to a predetermined value by stopping addition in calculation of the estimated fluid pressure.

In accordance with the present invention, when a driver is stepping on a brake pedal so lightly as to possibly cause antiskid control on a road surface on which his motor vehicle is running, not only extreme increase of estimated brake fluid pressure can be prevented from occurring owing to the fact that actual fluid pressure of each of the wheel cylinders does not rise so high as a pressure increasing command of brake fluid pressure for a solenoid controlled valve, but such a phenomenon can be prevented in which a pressure reducing command leads to a small brake fluid pressure reducing value suitable for a road surface having a higher coefficient of friction, thereby resulting in instability of the vehicle body.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
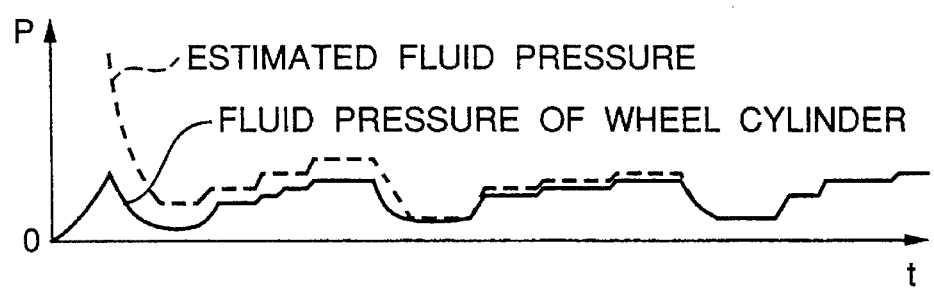
FIGS. 1 and 2 are graphs showing changes of estimated brake fluid pressure and brake fluid pressure in each wheel cylinder in a prior art antiskid control device (already referred to)
Figure 2:
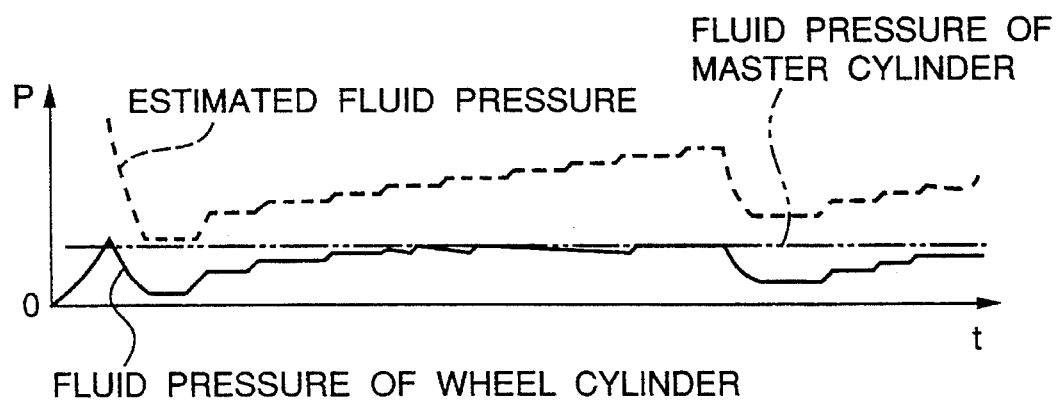
Figure 3:
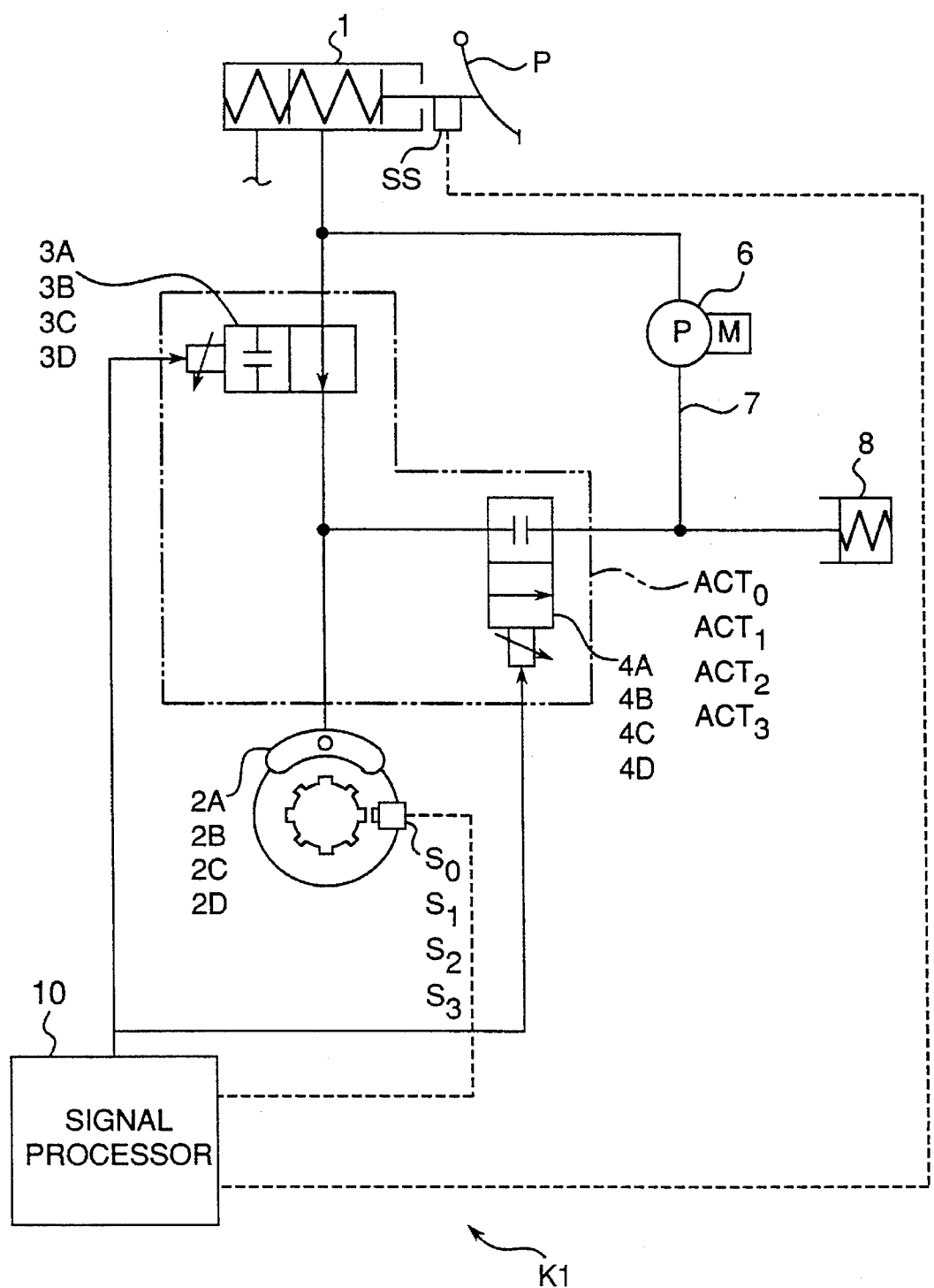
FIG. 3 is a schematic control diagram of an antiskid control device according to a first embodiment of the present invention.
Figure 4:
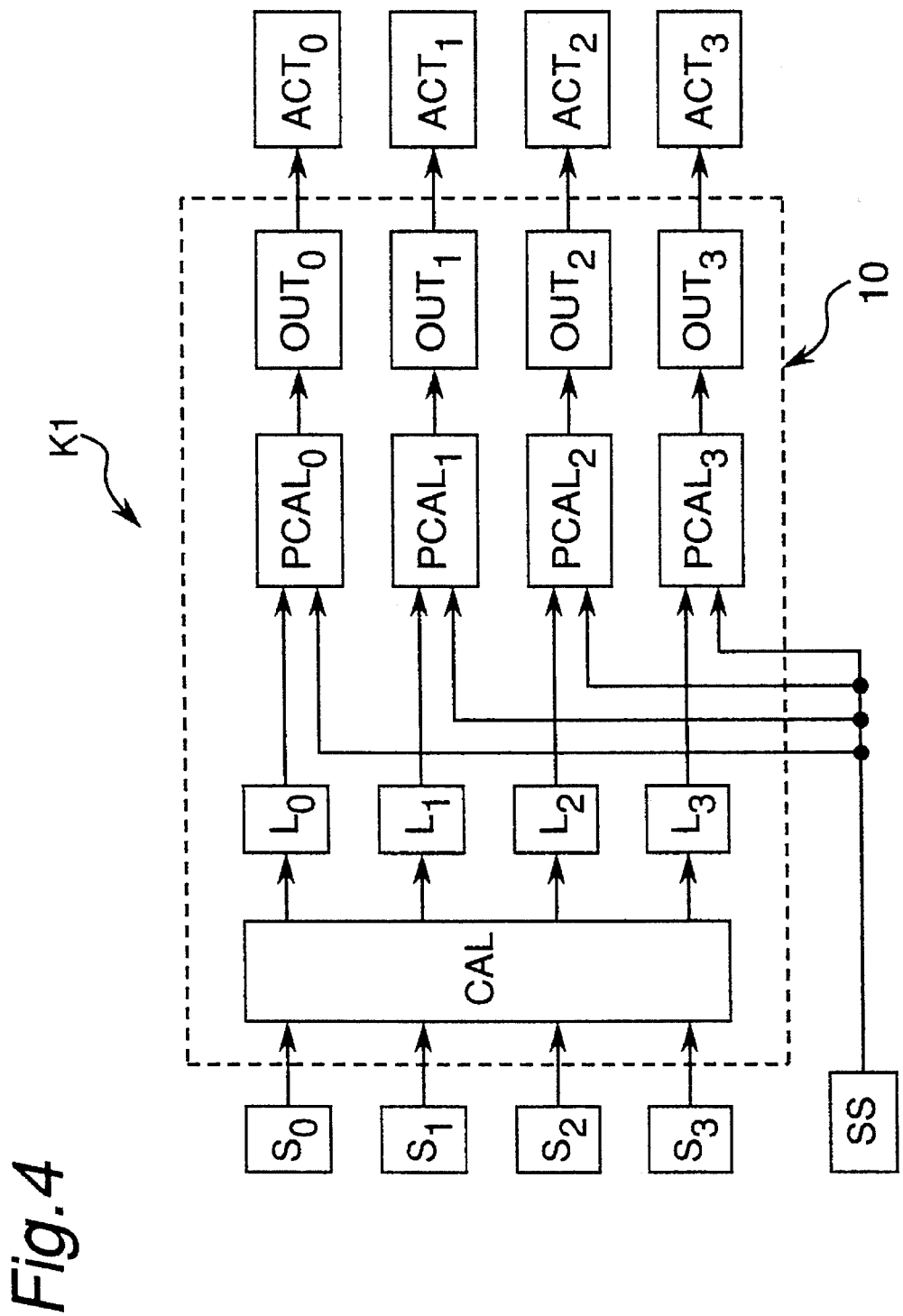
FIG. 4 is a schematic block diagram of the antiskid control device of FIG. 3.

Referring now to the drawings, there is shown in FIGS. 3 and 4, an antiskid control device K1 according to a first embodiment of the present invention. The antiskid control device K1 is adapted to be used for a four-wheel motor vehicle. Wheel cylinders 2A, 2B, 2C and 2D are, respectively, provided at front left, front right, rear left and rear right wheels. Inlet valves 3A, 3B, 3C and 3D, each formed by a an on-off type solenoid controlled valve, are provided between a master cylinder 1 and the wheels 3A, 3B, 3C and 3D, respectively. A return line 7 returns from the wheel cylinders 2A to 2D to the master cylinder 1 through outlet valves 4A, 4B, 4C and 4D, each formed by an on-off type solenoid controlled valve and a pump motor 6. A buffer chamber 8 is provided between the outlet valves 4A to 4D and the pump motor 6 of the return line 7.

Wheel speed detecting portions $S_0$, $S_1$, $S_2$ and $S_3$ are, respectively, provided for detecting speeds of the front left, front right, rear left and rear right wheels and send the detected wheel speeds, as wheel speed signals, to a signal processor 10, to be described below. A stroke sensor SS, attached to a pedal stroke, is a linear sensor and an output signal of the stroke sensor SS changes continuously according to changes of stepping stroke of a brake pedal P.

The signal processor 10 is formed by a microcomputer and includes an arithmetic portion CAL for calculating the wheel speeds and vehicle body speed; locking symptom detecting portions $L_0$, $L_1$, $L_2$ and $L_3$ for detecting locking symptom of the front left, front right, rear left and rear right wheels, respectively; pressure setting portions $PACL_0$, $PCAL_1$, $PCAL_2$ and $PCAL_3$, for setting estimated brake fluid pressures of the wheel cylinders 2A, 2B, 2C and 2D, respectively; and signal setting portions $OUT_0$, $OUT_1$, $OUT_2$ and $OUT_3$, for setting pressure increase or reduction signal Si (i=0–3) for the front left, front right, rear left and rear right wheels as shown in FIG. 4. Actuators $ACT_0$, $ACT_1$, $ACT_2$ and $ACT_3$ are, respectively, constituted by the inlet valves 3A to 3D and the outlet valves 4A to 4D. The above mentioned wheel speed signals and a signal from the stroke sensor SS are subjected to a predetermined processing and the pressure increase or reduction signals S0 to S3 are outputted to the actuators $ACT_0$ to $ACT_3$, respectively.

On the basis of the wheel speed signals inputted from the wheel speed detecting portions $S_0$ to $S_3$, the arithmetic portion CAL calculates, in a known manner, wheel speed $SPEED_i$ (i=0–3) for the front left, front right, rear left and rear right wheels; wheel acceleration or deceleration $d(SPEED_i)/dt$ (i=0–3); a quadratic differential of the wheel speed, $d^2(SPEED_i)/d^2t$ (i=0–3); and an estimated vehicle body speed VREF, which represent behaviors of the wheels and a vehicle body. Meanwhile, the arithmetic portion CAL compares the wheel speed $SPEED_i$ with the estimated vehicle body speed VREF. In case the wheel speed $SPEED_i$ is substantially coincident with the estimated vehicle body speed VREF so as to be synchronous with the estimated vehicle body speed VREF, the arithmetic portion CAL judges that synchronous state is established and sets synchronous flag $SYFLG_i$ (i=0–3) to "0". On the other hand, in a case where the wheel speed $SPEED_i$ is vastly different from the estimated vehicle body speed VREF, so as not to be synchronous with the estimated vehicle body speed VREF, the arithmetic portion CAL judges that an asynchronous state is established.

In case the synchronous flag $SYFLG_i$ was set to "0" in a previous control cycle, the locking symptom detecting portions $L_0$ to $L_3$ add "1" to synchronous timer $SYTMR_i$ (i=0–3) for counting the duration of the synchronous state. On the other hand, if the synchronous flag $SYFLG_i$ was set to "1" in the previous control cycle and the arithmetic portion CAL has judged that the synchronous state is established in this control cycle, the locking symptom detecting portions $L_0$ to $L_3$ clear the synchronous timer $SYTMR_i$ to "0". Meanwhile, when the difference between the wheel speed $SPEED_i$ and the estimated vehicle body speed VREF is not so large, but the wheel deceleration $d(SPEED_i)/dt$ is large, and when the wheel deceleration $d(SPEED_i)/dt$ is not so large but the difference between the wheel speed $SPEED_i$ and the estimated vehicle body speed VREF is large, the locking symptom detecting portions $L_0$ to $L_3$ judge that locking symptom is present.

If the locking symptom detecting portions $L_0$ to $L_3$ have judged that locking symptom is present as described above, the locking symptom detecting portions $L_0$ to $L_3$ set control request $REQ_i$ (i=0–3) to "pressure reduction" and set the synchronous flag $SYFLG_i$ to "1". On the other hand, if a locking symptom is not detected, the locking symptom detecting portions $L_0$ to $L_3$ set the control request $REQ_i$ to "pressure increase" or "control end" in accordance with duration of the synchronous state. Furthermore, the locking symptom detecting portions $L_0$ to $L_3$ detect a turning point from the synchronous state to detection of a locking symptom, a locking symptom detection edge. When the locking symptom detecting portions $L_0$ to $L_3$ have detected the locking symptom detection edge, the locking symptom detecting portions $L_0$ to $L_3$ read estimated brake fluid pressure $PT_i$ (i=0–3) of the wheel cylinders 2A to 2D as estimated fluid pressure $PL_i$ (i=0–3) of the wheel cylinders 2A to 2D at the locking symptom detection edge.

On the basis of the wheel speed $SPEED_i$ and the estimated vehicle body speed VREF, calculated by the arithmetic portion CAL in each control cycle, the pressure setting portions $PCAL_0$ to $PCAL_3$ set a pressure increase or reduction amount $DP_i$ (i=0–3), which is the amount of pressure increase or pressure reduction for brake fluid pressures of the wheel cylinders 2A to 2D in each control cycle. In addition, from the pressure increase or reduction amount $DP_i$ and the estimated fluid pressures $PL_i$ of the wheel cylinders 2A to 2D at the locking symptom detection edge, which are obtained by the locking symptom detecting portions $L_0$ to $L_3$, the pressure setting portions $PCAL_0$ to $PCAL_3$ calculate the estimated brake fluid pressure $PT_i$ of the wheel cylinders 2A to 2D from the following equations (1) and (2):

$$IDP_i = \sum_{n=1}^{k} (DP_i)n \quad (1)$$

$$PT_i = PL_i IDP_i \quad (2)$$

where k denotes the number of control cycles and $IDP_i = -PL_i$ if $IDP_i < -PL_i$.

As is apparent from the equation (2), the estimated brake fluid pressure $PT_i$ is calculated as a sum of the estimated brake fluid pressure $PL_i$ of the wheel cylinders 2A to 2D at the locking symptom detection edge and integrated value $IDP_i$ of the pressure increase or reduction amount $DP_i$. The integrated value $IDP_i$ of the pressure increase or reduction amount $DP_i$ can also be expressed by the following equation (3).

$$IDP_i = \int DP_i dt \quad (3)$$

Furthermore, on the basis of a preliminarily set and stored relation between the stepping stroke of the brake pedal P and the brake fluid pressure of the master cylinder 1, the pressure setting portions $PCAL_0$ to $PCAL_3$ calculate the brake fluid pressure of the master cylinder 1 by using the stepping stroke of the brake pedal P, detected by the stroke sensor SS and inputted to the pressure setting portions $PCAL_0$ to $PCAL_3$ in each control cycle, and set this brake fluid pressure of the master cylinder 1 to an upper limit PTmax of the estimated brake fluid pressure $PT_i$ of the wheel cylinders 2A to 2D.

In a case where the difference between the upper limit PTmax of the estimated brake fluid pressure $PT_i$ of the wheel cylinders 2A to 2D, calculated from stepping stroke of the brake pedal P detected by the stroke sensor SS in this control cycle, and the estimated brake fluid pressure $PL_i$ of the wheel cylinders 2A to 2D at the locking symptom detection edge is in the vicinity of zero, the pressure setting portions $PCAL_0$ to $PCAL_3$ change the integrated value $IDP_i$ calculated from the equation (1) to that calculated from the following equation (4).

$$IDP_i = PTmax - PL_i \quad (4)$$

Furthermore, by using in the equation (2) the integrated value $IDP_i$ calculated from the equation (4): the pressure setting portions $PCAL_0$ to $PCAL_3$ calculate the estimated brake fluid pressure $PT_i$ of the wheel cylinders 2A to 2D. Meanwhile, in the pressure setting portions $PCAL_0$ to $PCAL_3$, means for comparing the upper limit PTmax of the estimated brake fluid pressure $PT_i$ of the wheel cylinders 2A to 2D with the estimated brake fluid pressures $PL_i$ of the wheel cylinders 2A to 2D at the locking symptom detection edge acts as a comparative arithmetic unit and acts also as a differential pressure gauge together with the stroke sensor SS.

The signal setting portions $OUT_0$ to $OUT_3$ set the pressure increase or reduction signal Si on the basis of the estimated brake fluid pressure $PT_i$ of the wheel cylinders 2A to 2D and the pressure increase or reduction amount $DP_i$. The pressure increase or reduction signal $S_i$ includes a pressure reduction period Tdump, during which the outlet valves 4A to 4D are opened and the inlet valves 3A to 3D are closed in the actuators $ACT_0$ to $ACT_3$; and a pressure holding period Thold, during which the outlet valves 4A to 4D and the inlet valves 3A to 3D are closed and a pressure increase period during which the inlet valves 3A to 3D are opened and the outlet valves 4A to 4D are closed.

The pressure increase or reduction signal $S_i$ is outputted to the actuators $ACT_0$ to $ACT_3$ as follows. When the control request $REQ_i$ set by the locking symptom detecting portions $L_0$ to $L_3$ is "pressure increase", the inlet valves 3A to 3D are opened or closed in accordance with the pressure increase period Tapply or the pressure holding period Thold, while the outlet valves 4A to 4D are closed. On the other hand, when the control request $REQ_i$ set by the locking symptom detecting portions $L_0$ to $L_3$ is "pressure reduction", the outlet valves 4A to 4D are opened in accordance with the pressure reduction period Tdump and the pressure holding period Thold, while the inlet valves 3A to 3D are closed.

Figure 5:
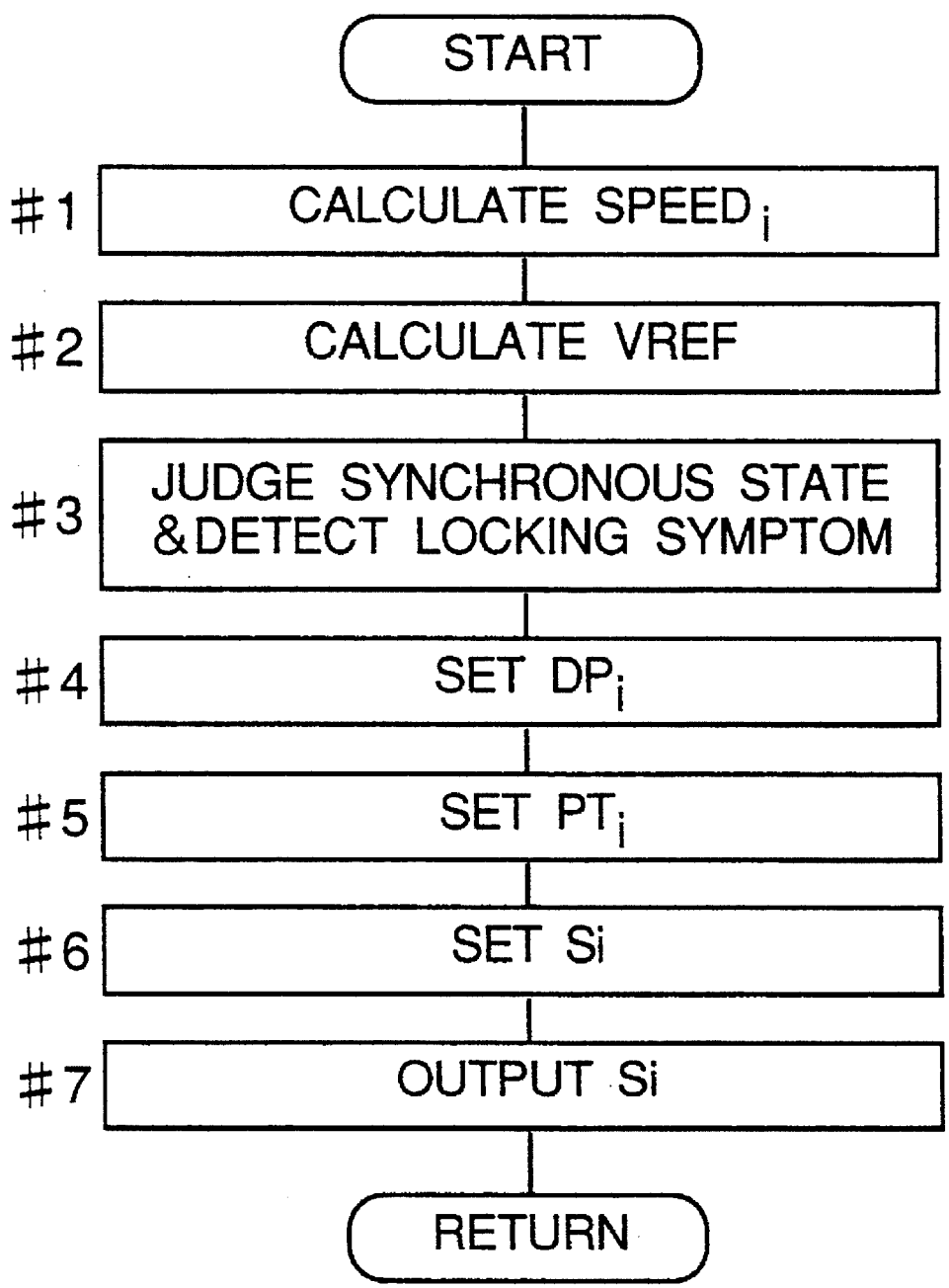
FIG. 5 is a flowchart showing an operation of the antiskid control device of FIG. 3.
Figure 6:
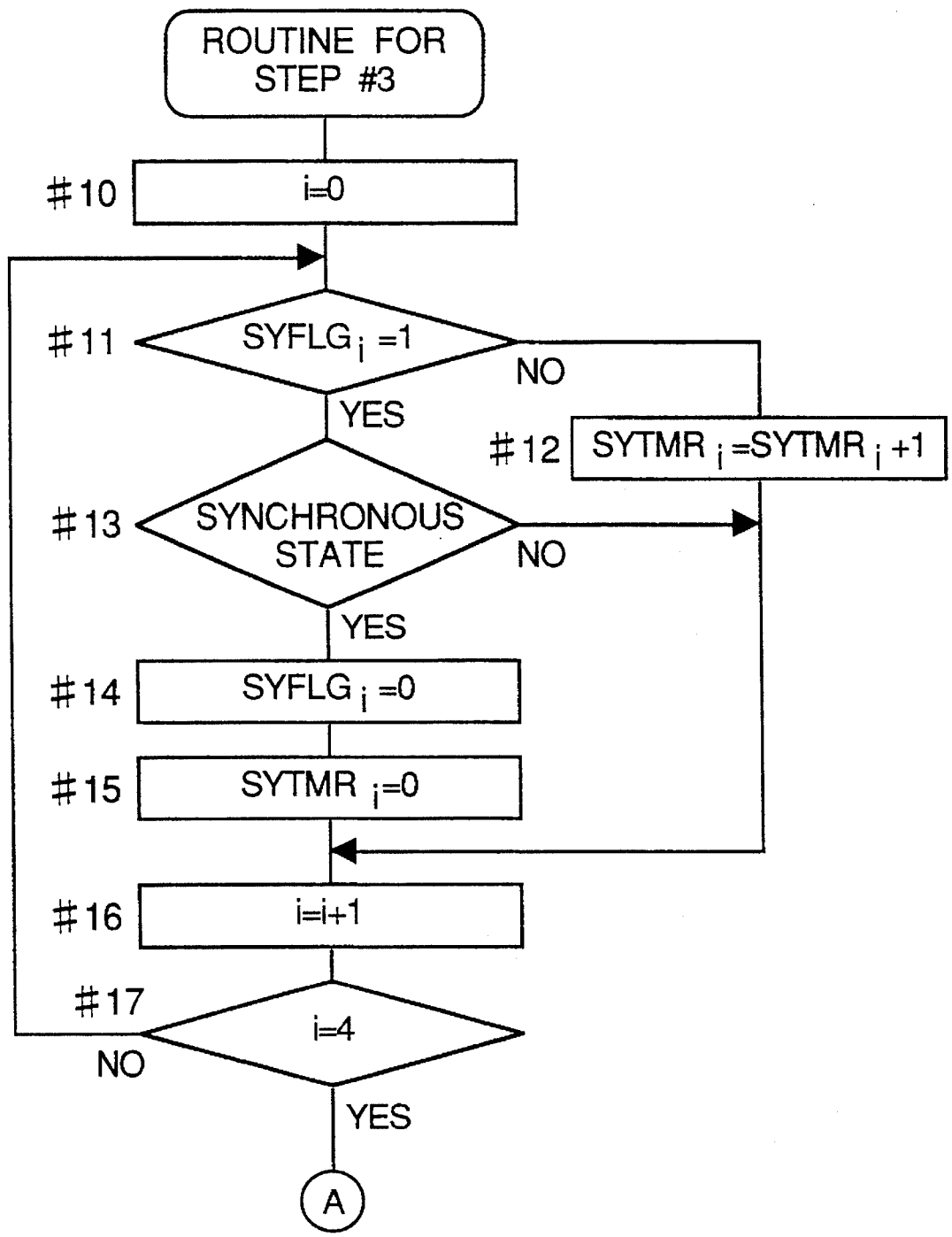
FIG. 6 is a flowchart showing a first half of one routine in the flowchart of FIG. 5.

Hereinafter, operation of the antiskid control device K1 is described with reference to the flowcharts shown in FIGS. 5 to 7. In FIG. 5, by processing the wheel speed signals from the wheel speed detecting portions $S_0$ to $S_3$, the arithmetic portion CAL initially calculates the wheel speed $SPEED_i$ at step #1. Subsequently, the arithmetic portion CAL calculates the estimated vehicle body speed VREF at step #2. Then, at step #3, the locking symptom detecting portions $L_0$ to $L_3$ judge establishment of the synchronous state and detect locking symptom of the wheels, and recovery of the wheels from locking symptom at step #3.

Here, step #3 of FIG. 5 is described in detail with reference to the flowcharts shown in FIGS. 6 and 7. Meanwhile, processings in FIGS. 6 and 7 are performed by the locking symptom detecting portions $L_0$ to $L_3$ unless otherwise specified. In FIG. 6, at step #10, count i of an index counter for counting indexes provided for the wheels, respectively, so as to be used for judging whether or not processings for all the four wheels have been completed, is set to "0". Then, at step #11, it is judged whether or not the synchronous flag $SYFLG_i$ of the wheel corresponding to count "0" of the index counter in the previous control cycle, i.e., the synchronous flag $SYFLG_0$ is set to "1". In the case of "NO" at step #11, namely, in case the synchronous state was established in the previous control cycle, "1" is added to count of the synchronous timer $SYTMR_i$, i.e., the synchronous timer $SYTMR_0$ in this instance.

On the other hand, in the case of "YES" at step #11, it is judged at step #13 whether or not the synchronous state is established. In the case of "YES" at step #13, the synchronous flag $SYFLG_0$ is set to "0" at step #14 and then, the synchronous timer $SYTMR_0$ is cleared to "0" at step #15. Subsequently, "1" is added to count i of the index counter at step #16, and then the program flow proceeds to step #17, at which it is judged whether or not count i of the index counter is "4". In the case of "NO" at step #17, the program flow returns to step #11. At step #11, it is judged whether or not the synchronous flag $SYFLG_i$ of the wheel corresponding to count "1" of the index counter in the previous control cycle, i.e., the synchronous flag $SYFLG_1$ is set to "1". Thereafter, processings similar to those for the wheel corresponding to count "0" of the index counter are performed for the wheel corresponding to count "1" of the index counter.

Figure 7:
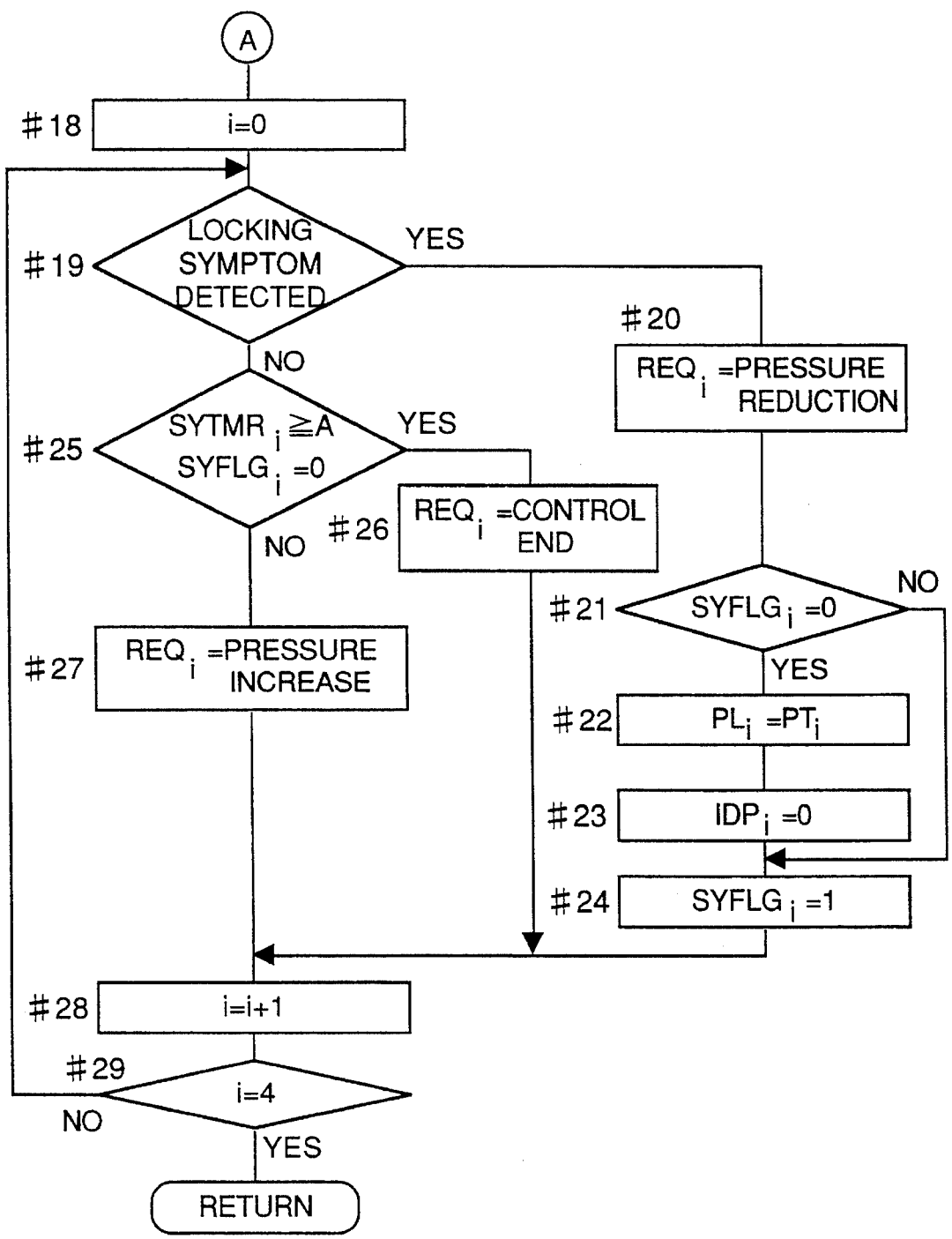
FIG. 7 is a flowchart showing a second half of the routine begun in FIG. 6.

Meanwhile, in the case of "YES" at step #17, processings from step #11 to step #15 have been performed for all the four wheels and thus, the program flow proceeds to step #18 of FIG. 7.

At step #18 in FIG. 7, count i of the index counter is set to "0" again. Then, at step #19, it is judged whether or not locking symptom is detected. In the case of "YES" at step #19, the control request $REQ_i$, i.e., the control request $REQ_0$ in this case is set to "pressure reduction" at step #20. Subsequently, at step #21, it is judged whether or not the synchronous flag $SYFLG_0$ is set to "0". In the case of "YES" at step #21, it can be concluded that the synchronous state was present up to the previous control cycle and locking symptom has been detected in this control cycle, namely, and therefore that the locking symptom detection edge has been detected. Thus, at step #22, the estimated fluid pressure $PT_0$ of the wheel cylinder 2A is set to the estimated fluid pressure $PL_0$ of the wheel cylinder 2A at the locking symptom detection edge. After the integrated value $IDP_0$ of the pressure increase or reduction amount $DP_0$ has been cleared to "0" at step #23, the synchronous flag $SYFLG_0$ is set to "1" at step #23.

On the other hand, in the case of "NO" at step #21, the locking symptom detection edge is not detected, and thus the program flow proceeds to step #24. Furthermore, in the case of "NO" at step #19, duration of the synchronous state is inspected at step #25 and the control request $REQ_0$ is set on the basis of the result of inspection of step #25. Namely, if it is found at step #25 that the synchronous flag $SYFLG_0$ is set to "0" and the count of the synchronous timer $SYTMR_0$ is not less than a preset value A, i.e., in the case of "YES" at step #25, it is judged that the synchronous state has been present for a sufficiently long period and thus, at step #26, the control request $REQ_0$ is set to "control end" at step #26. Meanwhile, if it is found at step #25 that the synchronous flag $SYFLG_0$ is set to "1" and/or count of the synchronous timer $SYTMR_0$ is less than the preset value A, i.e., in the case of "NO" at step #25, the control request $REQ_0$ is set to "pressure increase" at step #27.

Subsequently, after "1" has been added to the count i of the index counter at step #28, it is judged at step #29 whether or not the count i of the index counter is 4. In the case of "NO" at step #29, the program flow returns to step #19 at which locking symptom is detected at the wheel corresponding to count "1" of the index counter. Thereafter, processings similar to those for the wheel corresponding to count "0" of the index counter are performed for the wheel corresponding to count "1" of the index counter. Meanwhile, in the case of "YES" at step #29, processings from step #19 to step #27 have been performed for all the four wheels, and thus the program flow proceeds to step #4 of FIG. 5.

At step #4 of FIG. 5, the pressure increase or reduction amount $DP_i$ is set by the pressure setting portions $PCAL_0$ to $PCAL_3$. Then, at step #5, the estimated fluid pressure $PT_i$ of the wheel cylinders 2A to 2D is set by the pressure setting portions $PCAL_0$ to $PCAL_3$.

Figure 8:
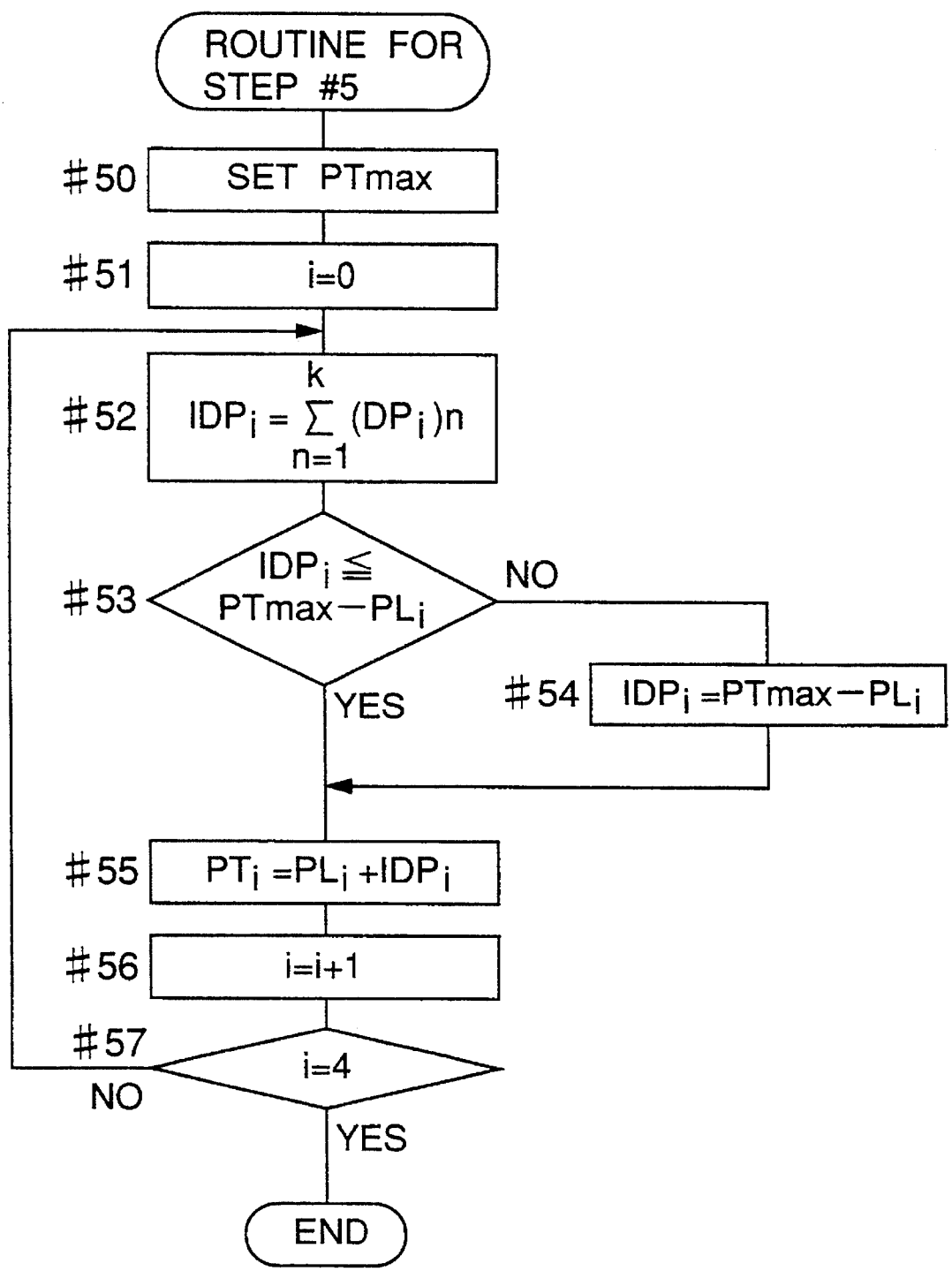
FIG. 8 is a flowchart showing another routine for calculating an estimated fluid pressure in each wheel cylinder in the flowchart of FIG. 5.

Here, step #5 of FIG. 5 is described in detail with reference to the flowchart shown in FIG. 8. The process steps in FIG. 8 are performed by the pressure setting portions $PCAL_0$ to $PCAL_3$ unless otherwise specified. Initially, at step #50, the upper limit PTmax of the estimated fluid pressure $PT_i$ of the wheel cylinders 2A to 2D, corresponding to fluid pressure of the master cylinder 1, is calculated from, stepping stroke of the brake pedal P, which is detected by the stroke sensor SS. Then, the count i of the index counter is set to "0" at step #51 and the integrated value $IDP_i$ of the pressure increase or reduction amount $DP_i$ up to this control cycle for the wheel corresponding to count "0" of the index counter, i.e., the integrated value $IDP_0$, of the pressure increase or reduction amount $DP_0$ is calculated at step #52.

Subsequently, at step #53, it is judged whether or not the integrated value $IDP_0$ of step #52 is equal to or less than a difference obtained by subtracting from the upper limit PTmax of step #50 from the estimated fluid pressure $PL_0$ of the wheel cylinder 2A at the locking symptom detection edge. In the case of "NO" at step #53, the integrated value $IDP_0$, calculated at step #52, is replaced by the difference of step #53 between the upper limit PTmax and the estimated fluid pressure $PL_0$ of the wheel cylinder 2A at the locking symptom detection edge at step #54. Then, at step #55, the estimated fluid pressure $PT_0$ of the wheel cylinder 2A is calculated by adding the integrated value $IDP_0$ to the estimated fluid pressure $PL_0$ of the wheel cylinder 2A at the locking symptom detection edge.

On the other hand, in the case of "YES" at step #53, the program flow proceeds to step #55. Subsequently, "1" is added to count i of the index counter at step #56, and then it is judged at step #57, whether or not the count i of the index counter is 4. In the case of "NO" at step #57, the program flow returns to step #52 at which the integrated value $IDP_1$ of the pressure increase or reduction amount $DP_1$ for the wheel corresponding to count "1" of the index counter is calculated. Thereafter, processings similar to those for the wheel corresponding to count "0" of the index counter are performed for the wheel corresponding to count "1" of the index counter. Meanwhile, in the case of "YES" at step #57, processings from step #52 to step #55 have been performed for all the four wheels, and thus the program flow proceeds to step #6 of FIG. 5.

At step #6 of FIG. 5, the pressure increase or reduction signal Si for the actuators $ACT_0$ to $ACT_3$ of the respective wheels is set by the signal setting portions $OUT_0$ to $OUT_3$. Then, at step #7, the pressure increase or reduction signal Si is outputted to the actuators $ACT_0$ to $ACT_3$ for the corresponding wheels and thus, the program flow of FIG. 5 is terminated.

Figure 9:
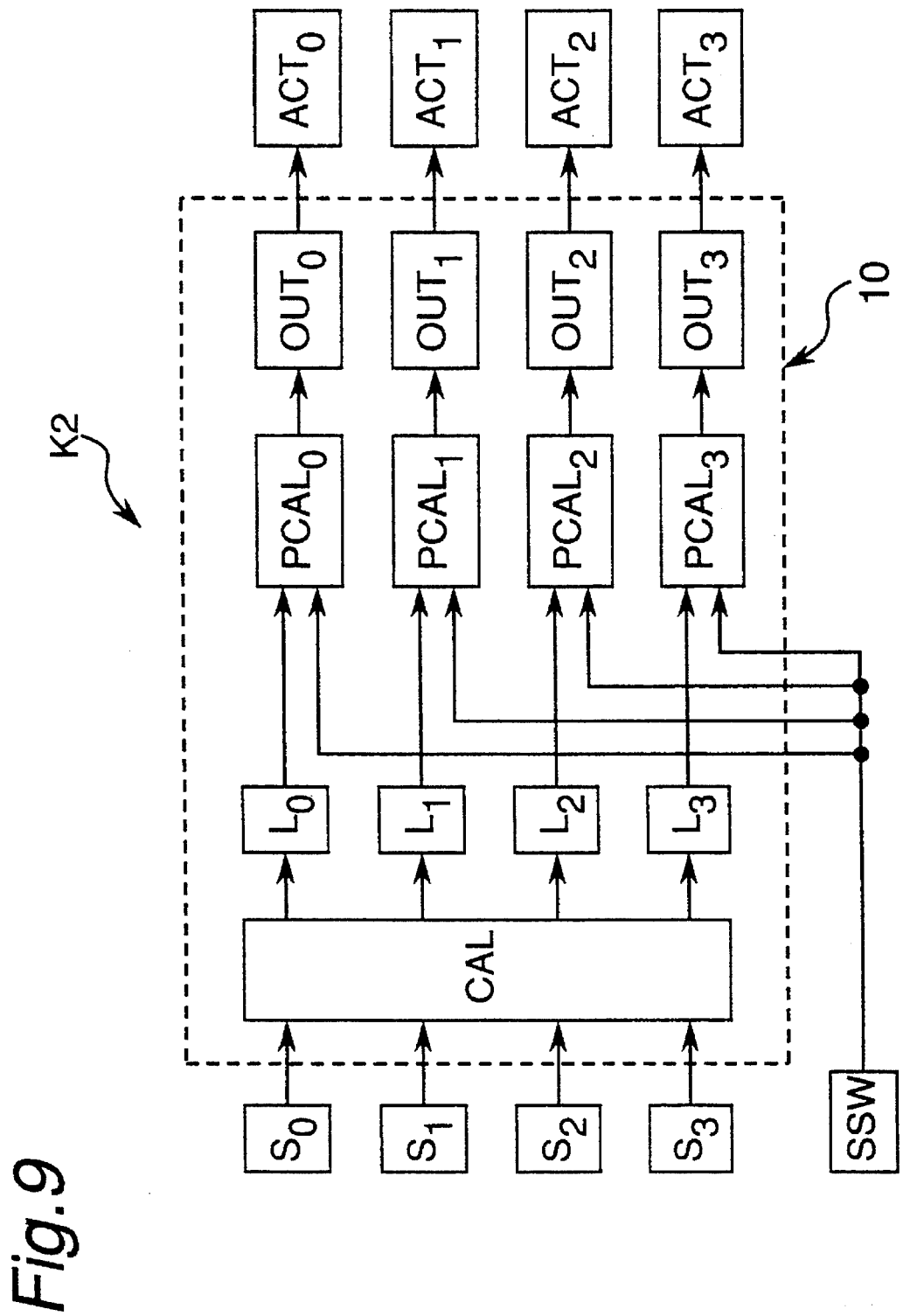
FIG. 9 is a schematic block diagram of an antiskid control device according to a second embodiment of the present invention.

In the first embodiment, a linear sensor acting as a differential pressure gauge is employed as the stroke sensor SS. FIG. 9 shows an antiskid control device K2 according to a second embodiment of the present invention. In the antiskid control device K2, the stroke sensor SS of the first embodiment is replaced by a stroke switch SSW, formed by an on-off type switch. The stroke switch SSW is an on-off type switch which is adapted to detect, from the stepping stroke of the brake pedal P, whether or not a driver is stepping on the brake pedal P so lightly as to possibly cause antiskid control on a road surface on which his motor vehicle is running. In this embodiment, in case the driver is stepping on the brake pedal P lightly as described above, the stroke switch SSW is turned off as one example but may also be turned on. Furthermore, the stroke switch SSW may also be of a multipoint type. Since other constructions of the antiskid control device K2 are similar to those of the antiskid control device K1, the description is not repeated here, for the sake of brevity.

In FIG. 9, from a binary signal inputted from the stroke switch SSW in each control cycle, the pressure setting portions $PCAL_0$ to $PCAL_3$ detect whether or not the driver is stepping on the brake pedal so lightly as to possibly cause antiskid control on the road surface on which his motor vehicle is running.

Figure 10:
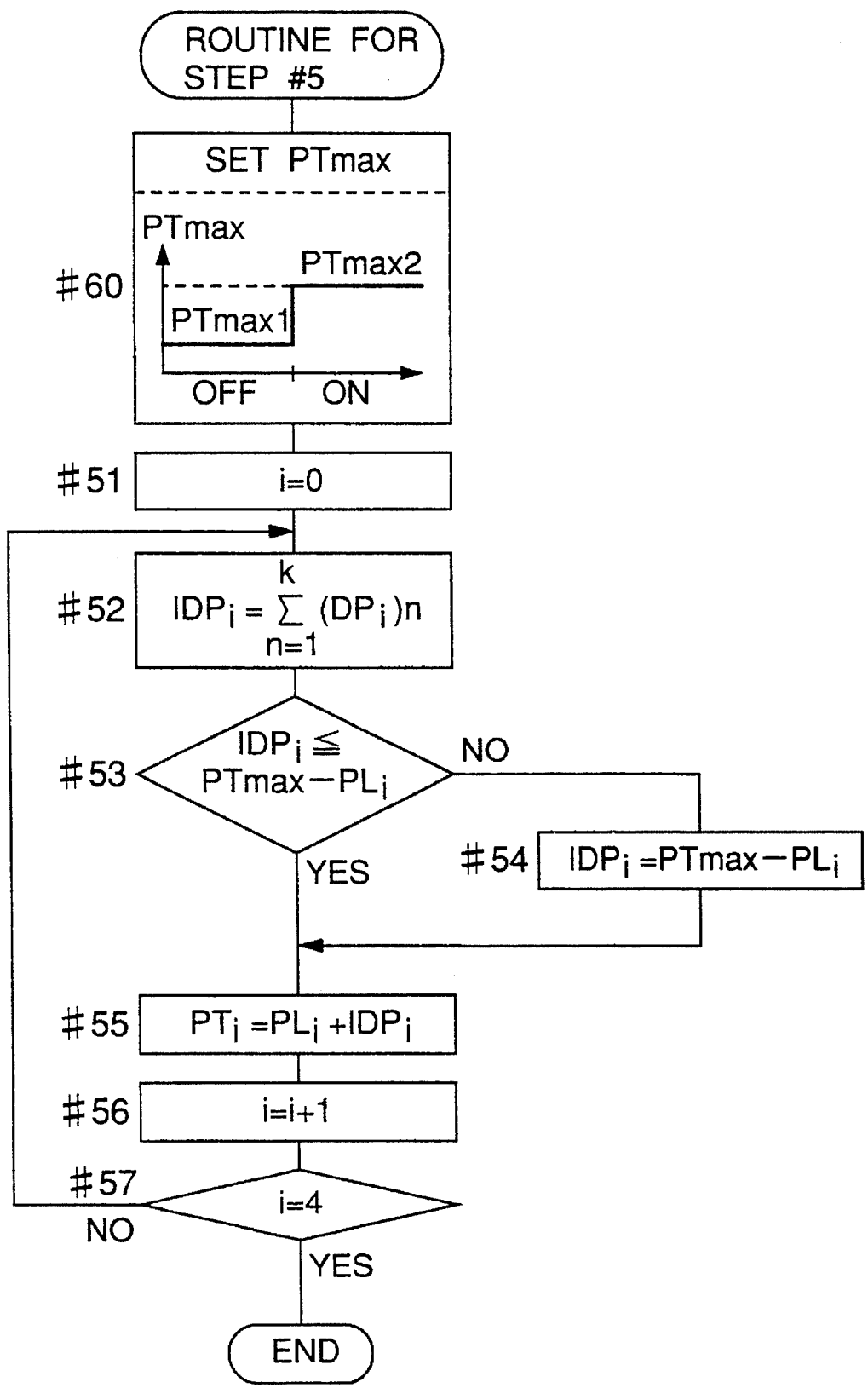
FIG. 10 is a flowchart showing a routine for calculating an estimated brake fluid pressure in each wheel cylinder in operation of the antiskid control device of FIG. 9.

In operation of the antiskid control device K2, only the flowchart shown in FIG. 8, among the flowcharts shown in FIGS. 5 to 8 for the antiskid control device K1, is replaced by the flowchart shown in FIG. 10. Therefore, operation of the antiskid control device K2 is described with reference to the flowchart of FIG. 10, hereinafter. Meanwhile, in FIG. 10, processings identical with those of FIG. 8 for the antiskid control device K1 are designated by steps identical with those of FIG. 8. Therefore, in FIG. 10, only processings different from those of FIG. 8 are described here. Meanwhile, also in FIG. 10, processings are performed by the pressure setting portions $PCAL_0$ to $PCAL_3$ unless otherwise specified.

FIG. 10 is different from FIG. 8 only in that step #50 of FIG. 8 is replaced by step #60 in FIG. 10. In FIG. 10, the upper limit PTmax of the estimated fluid pressure $PT_i$ of the wheel cylinders 2A to 2D is set in accordance with state of the stroke switch SSW and then, process steps, from step #51 on, are performed.

Figure 11:
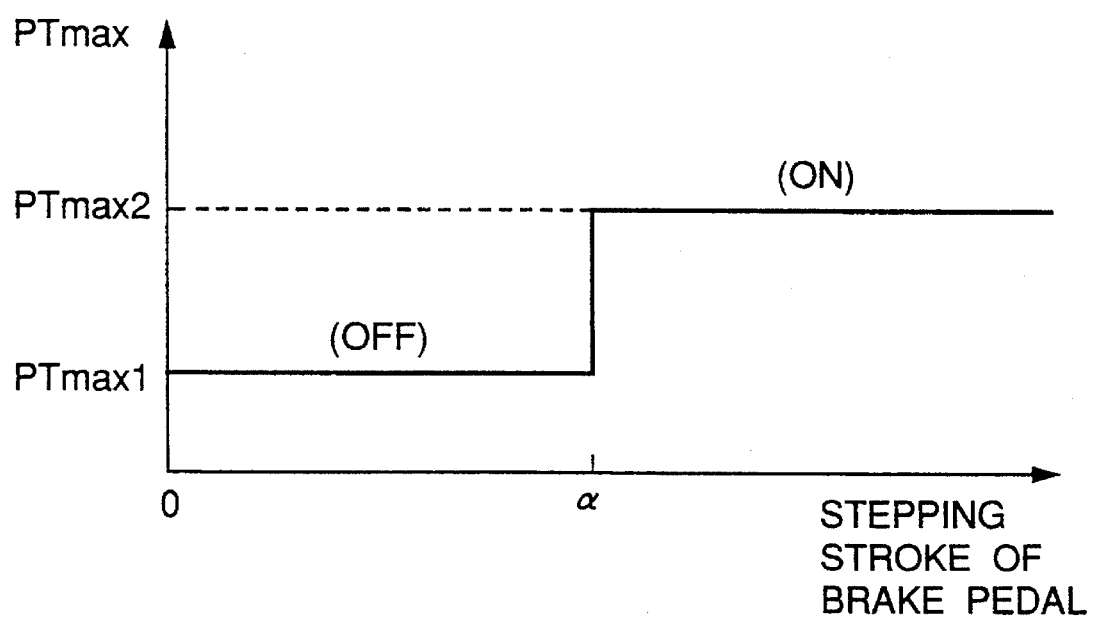
FIG. 11 is a graph showing upper limit PTmax of the brake fluid pressure of FIG. 10.

FIG. 11 shows a relation among the stepping stroke of the brake pedal P, the state of the stroke switch SSW and the upper limit PTmax of the estimated fluid pressure $PT_i$ of the wheel cylinders 2A to 2D. By referring to FIG. 11, the setting of the upper limit PTmax of the estimated fluid pressure $PT_i$ of the wheel cylinders 2A to 2D is described. In FIG. 11, when the stepping stroke of the brake pedal P reaches not less than α, the stroke switch SSW is turned ON from an OFF state. On the contrary, when the stepping stroke of the brake pedal P becomes smaller than α, the stroke switch SSW is turned OFF from an ON state. When the stroke switch SSW is in an OFF state, the upper limit PTmax of the estimated fluid pressure $PT_i$ of the wheel cylinders 2A to 2D is set to a first predetermined value PTmax1. On the other hand, when the stroke switch SSW is in an ON state, the upper limit PTmax of the estimated fluid pressure $PT_i$ of the wheel cylinders 2A to 2D is set to a second predetermined value PTmax2 larger than the first predetermined value PTmax1. For example, the first and second predetermined values PTmax1 and PTmax2 are set to 40 and 120 bars, respectively. Furthermore, when a multipoint type switch, for example, a three-point switch is used as the stroke switch SSW so as to divide the stepping stroke of the brake pedal P into three levels, the upper limit PTmax of the estimated fluid pressure $PT_i$ of the wheel cylinders 2A to 2D may be set to, e.g., 40, 80 and 120 bars.

Figure 12:
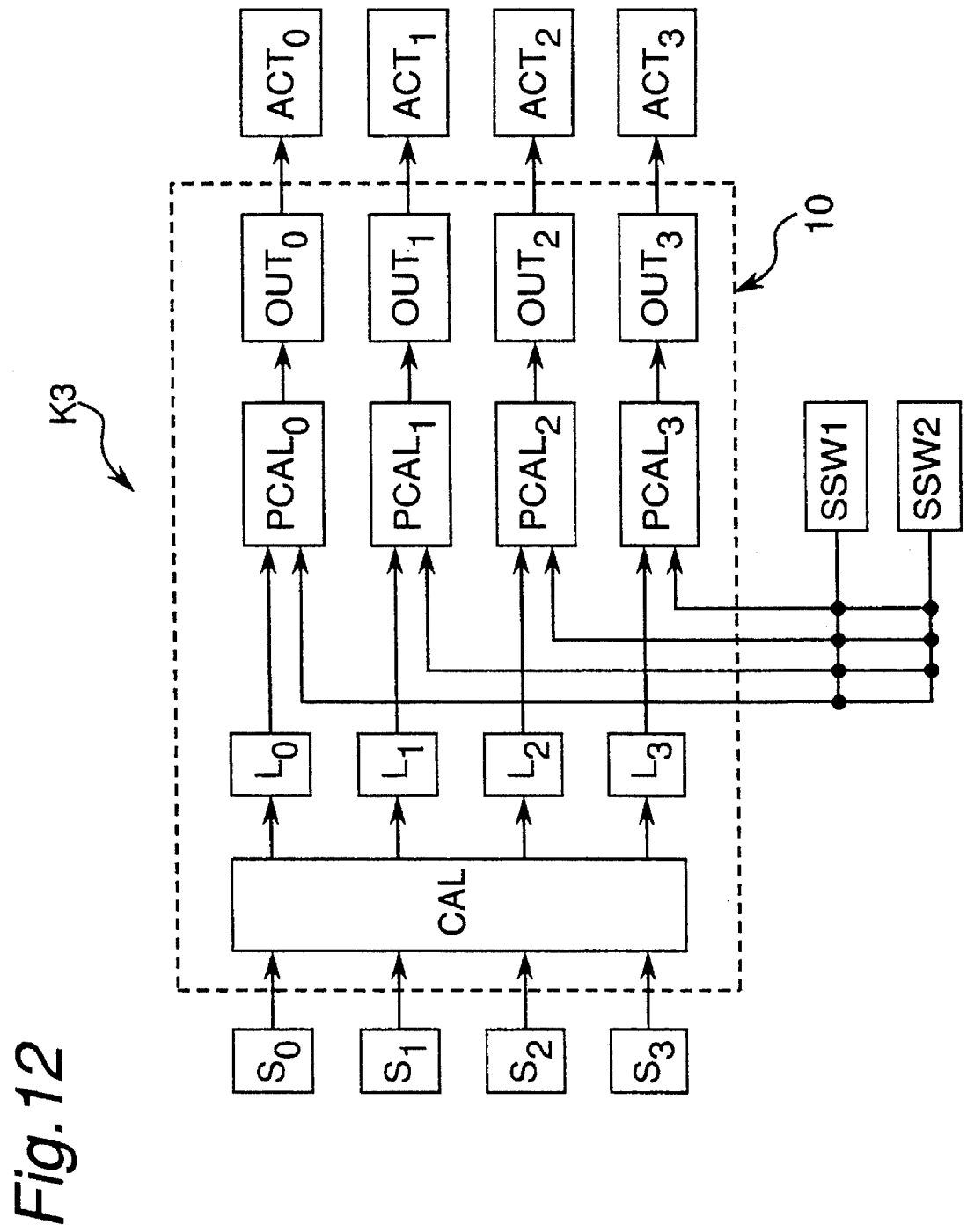
FIG. 12 is a schematic block diagram of an antiskid control device according to a third embodiment of the present invention.

In the second embodiment, the single stroke switch SSW is employed. FIG. 12 shows an antiskid control device K3 according to a third embodiment of the present invention. In the antiskid control device K3, a plurality of, for example, first and second stroke switches SW1 and SW2 are employed in place of the single stroke switch SSW of the antiskid control device K2. Each of the first and second stroke switches SSW1 and SSW2 is an on-off type switch which detects from stepping stroke of the brake pedal P whether or not the driver is stepping on the brake pedal P so lightly as to possibly cause antiskid control on a road surface on which his motor vehicle is running. In this embodiment, when the driver is stepping on the brake pedal P lightly as described above, the first and second stroke switches SSW1 and SSW2 are turned OFF as one example but may also be turned ON.

In FIG. 12, from a coincidence of binary signals inputted from the first and second stroke switches SSW1 and SSW2 in each control cycle, the pressure setting portions $PCAL_0$ to $PCAL_3$ detect whether or not the driver is stepping on the brake pedal P so lightly as to possibly cause antiskid control on the road surface on which his motor vehicle is running. In the third embodiment, the two stroke switches are employed but three stroke switches or more may be employed.

Figure 13:
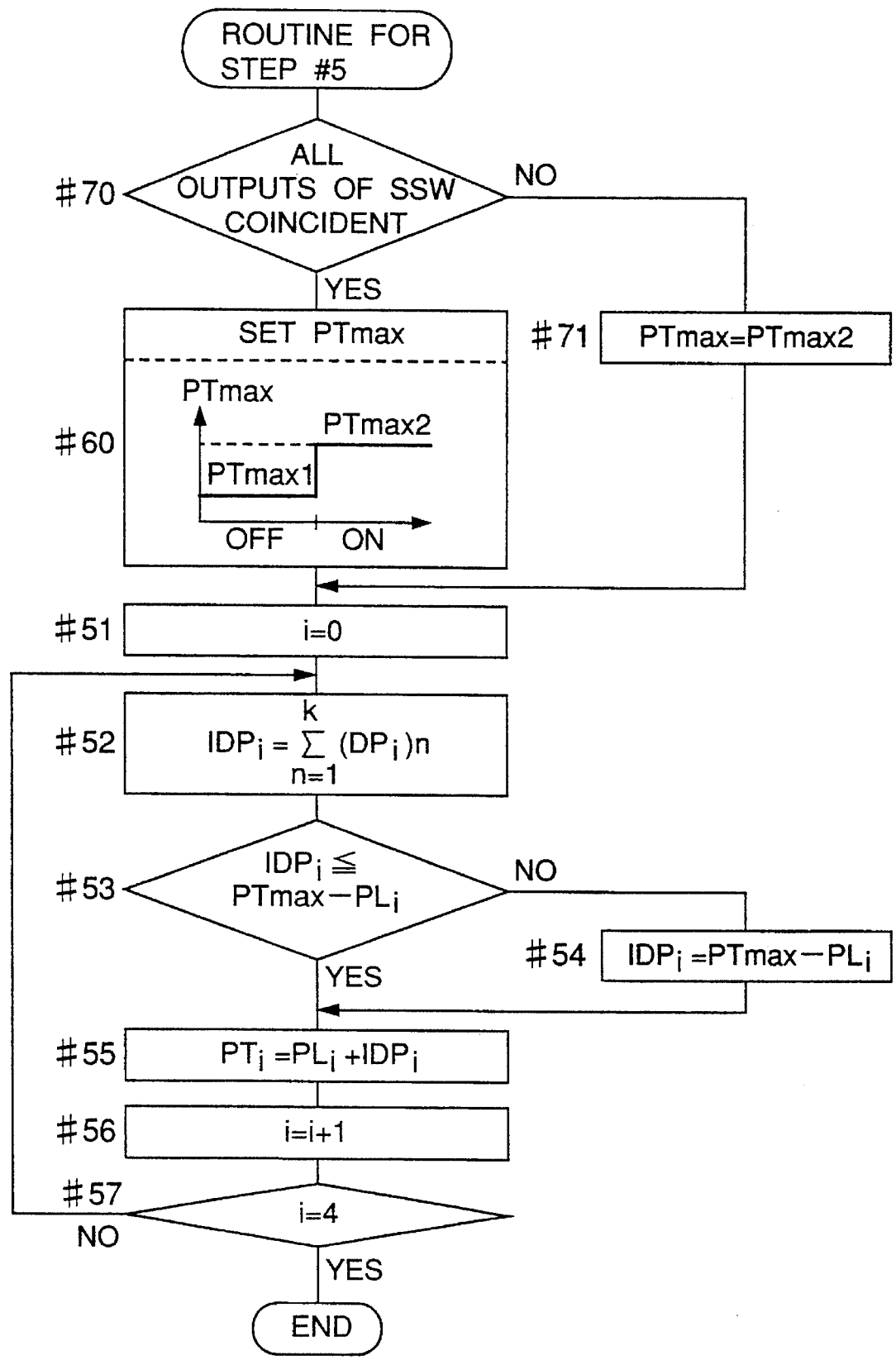
FIG. 13 is a flowchart showing a routine for calculating an estimated brake fluid pressure in each wheel cylinder in operation of the antiskid control device of FIG. 12.

In operation of the antiskid control device K3, the flowchart shown in FIG. 10 for the antiskid control device K2 is replaced by the flowchart shown in FIG. 13. Therefore, the operation of the antiskid control device K3 is described with reference to the flowchart of FIG. 13, hereinafter. In FIG. 13, process steps identical with those of FIGS. 8 and 10 for the antiskid control devices K1 and K2 are designated by steps identical with those of FIGS. 8 and 10. Therefore, only process steps different from those of FIG. 10 are described here. Meanwhile, also in FIG. 13, processings are performed by the pressure setting portions $PCAL_0$ to $PCAL_3$ unless otherwise specified. FIG. 13 is different from FIG. 10 only in that step #70, preceding step #60, and step #71, disposed between steps #70 and #51, are additionally provided in FIG. 13. In FIG. 13, initially, it is judged at step #70 whether or not outputs of the first and second stroke switches SSW1 and SSW2 coincide with each other. In the case of "YES" at step #70, the program flow proceeds to step #60. On the other hand, in the case of "NO" at step #70, the upper limit PTmax of the estimated fluid pressure $PT_i$ of the wheel cylinders 2A to 2D is set to the second predetermined value PTmax2 at step #71 and then, the program flow proceeds to step #51.

Figure 14:
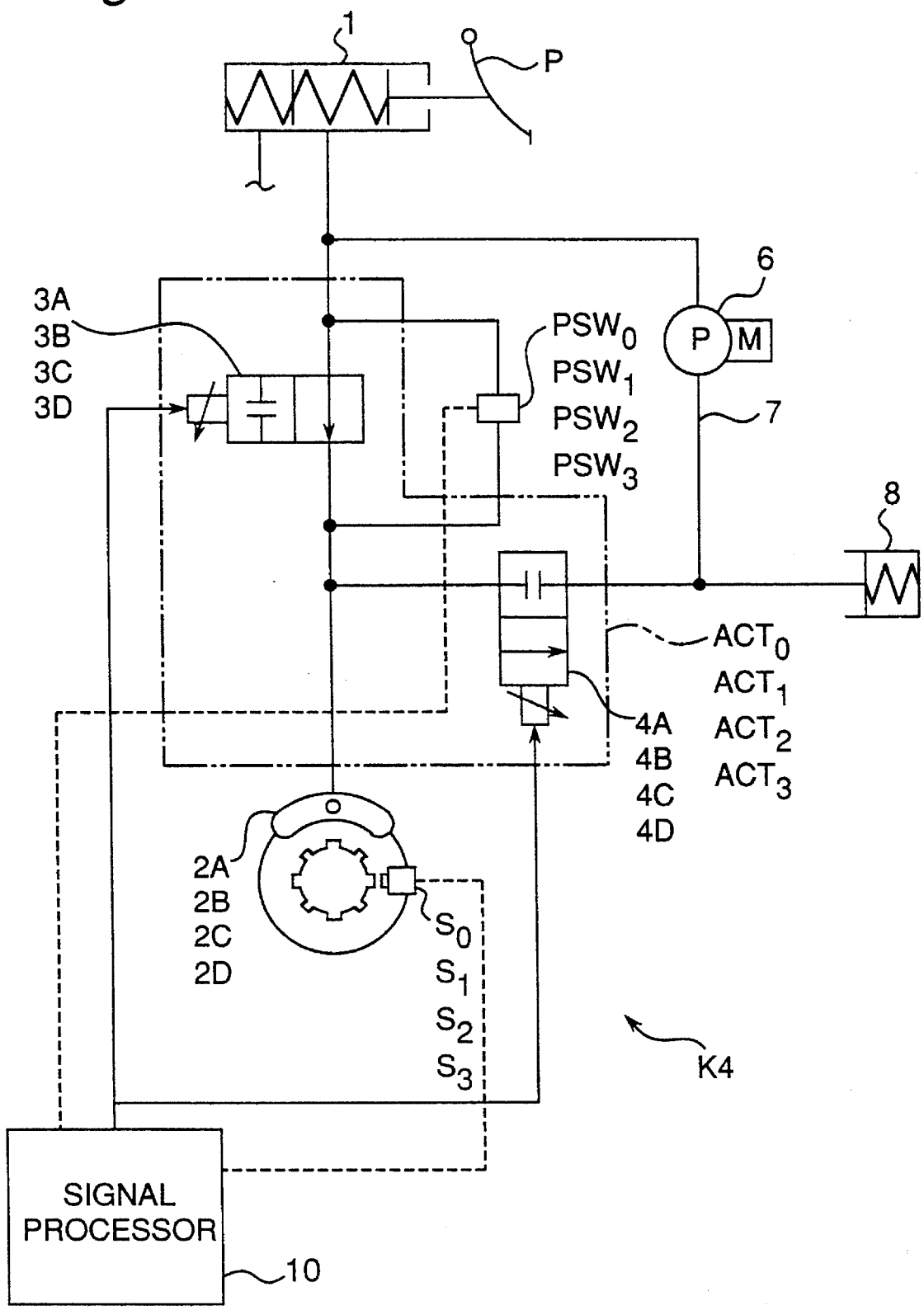
FIG. 14 is a schematic control diagram of an antiskid control device according to a fourth embodiment of the present invention.
Figure 15:
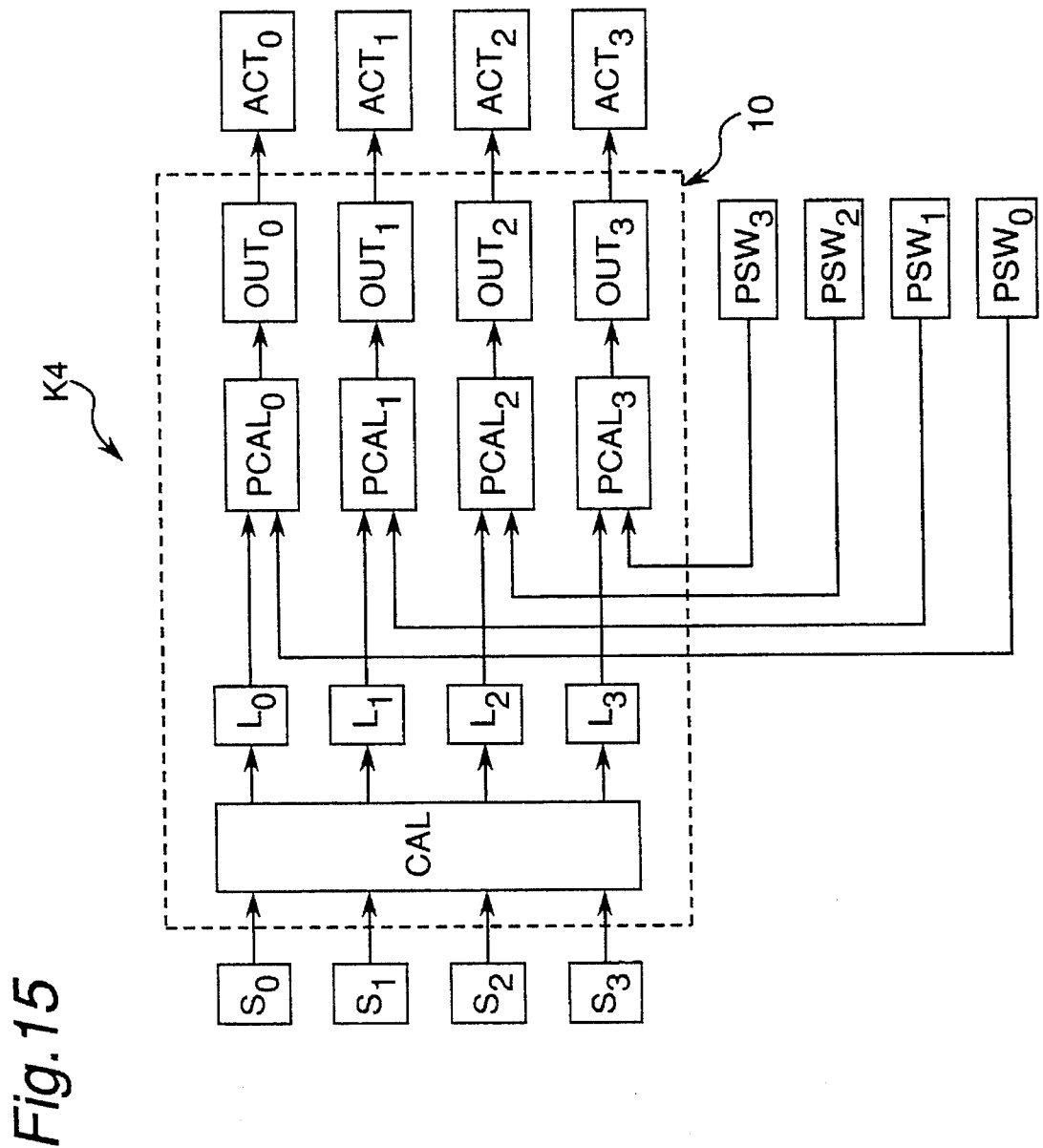
FIG. 15 is a schematic block diagram of the antiskid control device of FIG. 14.

In the first to third embodiments, it is detected indirectly from the stepping stroke of the brake pedal P in each control cycle whether or not fluid pressure of the master cylinder 1 is sufficiently higher than fluid pressure of each of the wheel cylinders 2A to 2D. FIGS. 14 and 15 show an antiskid control device K4 according to a fourth embodiment of the present invention. The antiskid control device K4 includes differential pressure switches $PSW_0$, $PSW_1$, $PSW_2$ and $PSW_3$ for directly detecting whether or not a difference between the fluid pressure of the master cylinder 1 and the fluid pressure of each of the wheel cylinders 2A to 2D is in the vicinity of zero. In the antiskid control device K4, only constructions in FIGS. 14 and 15 different from those of FIGS. 3 and 4 for the first embodiment are described for the sake of brevity. FIGS. 14 and 15 are different from FIGS. 3 and 4 only in that in FIGS. 14 and 15, the differential pressure switches $PSW_0$ to $PSW_3$, acting as differential pressure gauges, are connected in parallel to the inlet valves 3A to 3D in the actuators $ACT_0$ to $ACT_3$, respectively, without using the stroke sensor SS of FIGS. 3 and 4, so as to detect whether or not a difference between fluid pressure in a line connecting each of the inlet valves 3A to 3D and the master cylinder 1, and fluid pressure in a line connecting each of the inlet valves 3A to 3D and the wheel cylinders 2A to 2D, is in the vicinity of zero. Thus, a binary signal indicative of whether or not the above mentioned pressure difference is in the vicinity of zero is inputted from each of the differential pressure switches $PSW_0$ to $PSW_3$, to each of the pressure setting portions $PCAL_0$ to $PCAL_3$ for the corresponding wheels.

In the first embodiment described earlier, the upper limit PTmax of the estimated fluid pressure $PT_i$, which corresponds to fluid pressure of the master cylinder 1, is calculated by the pressure setting portions $PCAL_0$ to $PCAL_3$ from stepping stroke of the brake pedal P detected by the stroke sensor SS and the difference between this calculated upper limit PTmax and the estimated fluid pressure $PL_i$ of the wheel cylinders 2A to 2D at the locking symptom detection edge, which is inputted from the locking symptom detecting portions $L_0$ to $L_3$, is calculated.

On the other hand, in the fourth embodiment of FIGS. 14 and 15, the differential pressure switches $PSW_0$ to $PSW_3$ directly detect, as binary values, whether or not the above mentioned pressure difference is in the vicinity of zero and the pressure setting portions $PCAL_0$ to $PCAL_3$, judge from binary signals of the differential pressure switches $PSW_0$ to $PSW_3$, whether or not the difference between the fluid pressure of the master cylinder 1 and the fluid pressure of each of the wheel cylinders 2A to 2D is in the vicinity of zero. In this embodiment, when the above mentioned pressure difference is in the vicinity of zero, the differential pressure switches $PSW_0$ to $PSW_3$ are turned ON as one example but may also be turned OFF.

Figure 16:
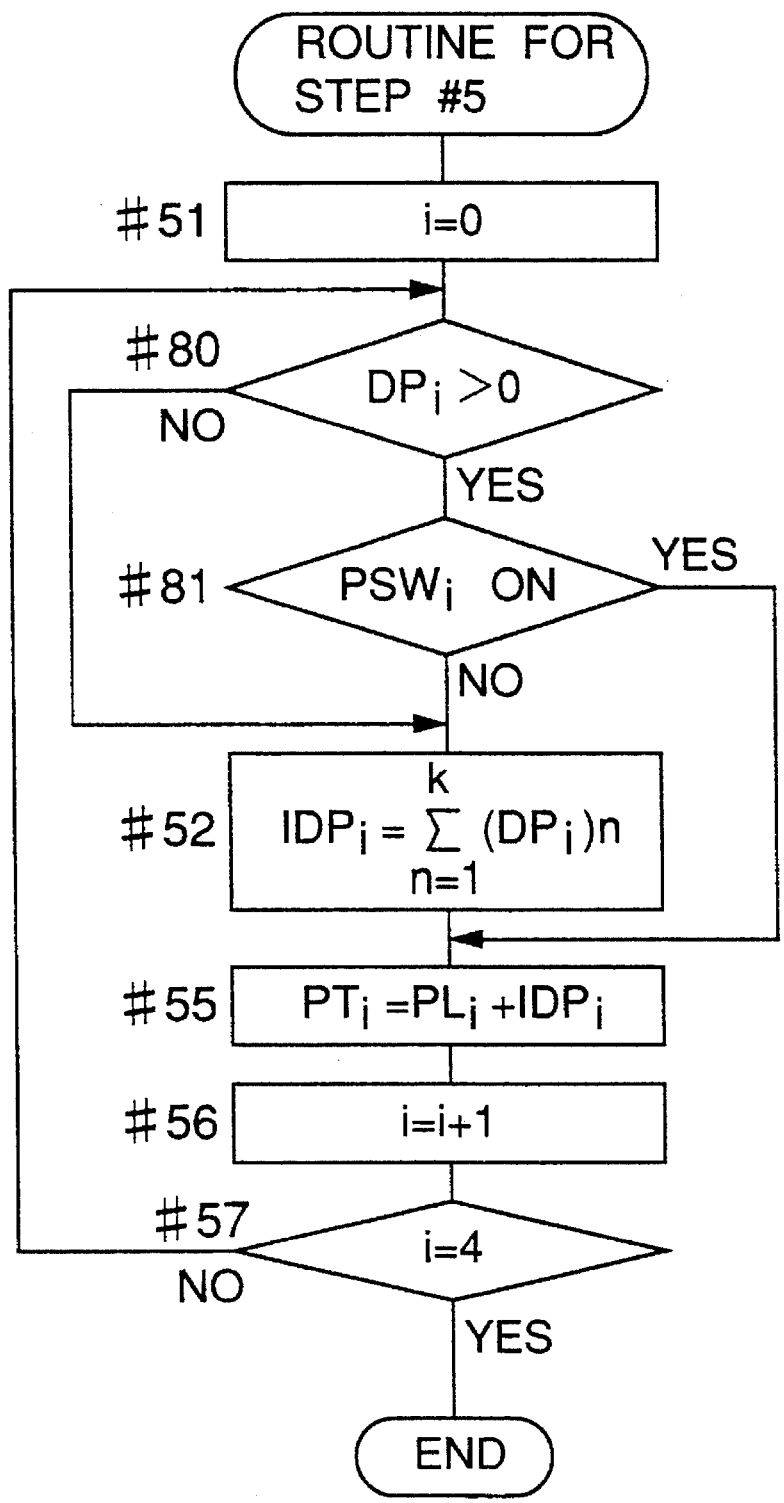
FIG. 16 is a flowchart showing a routine for calculating an estimated brake fluid pressure in each wheel cylinder in operation of the antiskid control device of FIG. 14.

In operation of the antiskid control device K4, only the flowchart shown in FIG. 8 among the flowcharts shown in FIGS. 5 to 8 for the first embodiment is replaced by a flowchart shown in FIG. 16. Therefore, the operation of the antiskid control device K4 is described with reference to the flowchart of FIG. 16, hereinafter. In FIG. 16, processings identical with those of FIG. 8 for the antiskid control device K1 are designated by steps identical with those of FIG. 8. Therefore, in FIG. 16, only processings different from those of FIG. 8 are described here. Meanwhile, also in FIG. 16, processings are performed by the pressure setting portions $PCAL_0$ to $PCAL_3$ unless otherwise specified.

FIG. 16 is different from FIG. 8 only in that in FIG. 16, steps #50, #53 and #54 of FIG. 8 are deleted and steps #80 and #81 are additionally provided between steps #51 and #52. In FIG. 16, after a processing of step #51 has been performed, the program flow proceeds to step #80 at which it is judged whether or not the pressure increase or reduction amount $DP_i$ is positive. In the case of "YES" at step #80, it is judged at step #81 whether or not the differential pressure switches $PSW_0$ to $PSW_3$ are in the ON state, namely, whether the difference between the fluid pressure of the master cylinder 1 and the fluid pressure of each of the wheel cylinders 2A to 2D is in the vicinity of zero. In the case of "NO" at step #81, namely, when the difference between the fluid pressure of the master cylinder 1 and the fluid pressure of each of the wheel cylinders 2A to 2D is not in the vicinity of zero, the program flow proceeds to step #52, followed by step #55.

On the other hand, in the case of "YES" at step #81, namely, when the difference between the fluid pressure of the master cylinder 1 and the fluid pressure of each of the wheel cylinders 2A to 2D is in the vicinity of zero, the program flow proceeds to step #55 by skipping step #52 at which the pressure increase or reduction amount $DP_i$ of this control cycle is added to the integrated value $IDP_i$ of the pressure increase or reduction amount $DP_i$. Furthermore, in the case of "NO" at step #80, the program flow proceeds to step #52. Meanwhile, in the case of "NO" at step #57, namely, when the count i of the index counter is not 4, the program flow returns to step #80.

Figure 17:
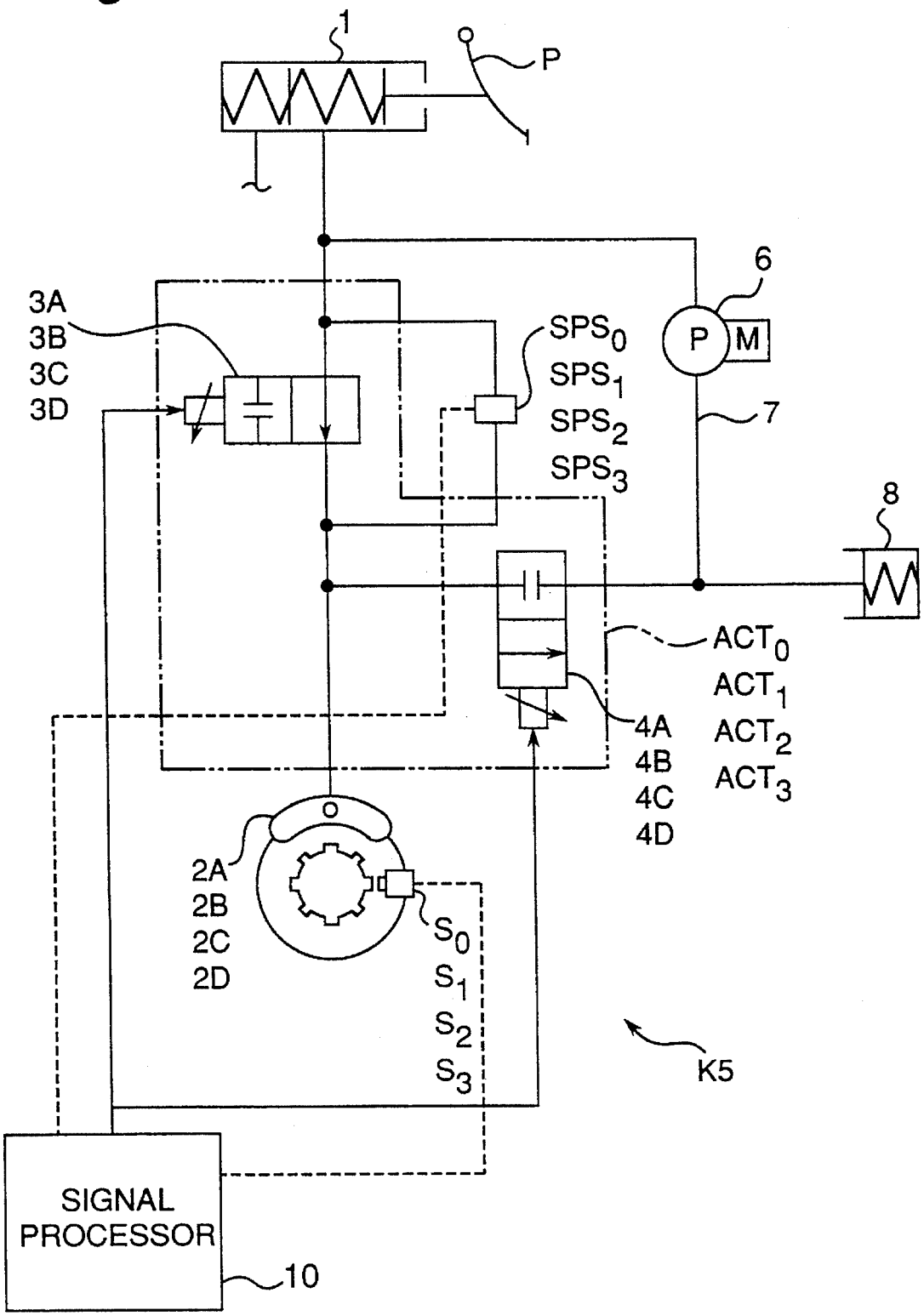
FIG. 17 is a schematic control diagram of an antiskid control device according to a fifth embodiment of the present invention.
Figure 18:
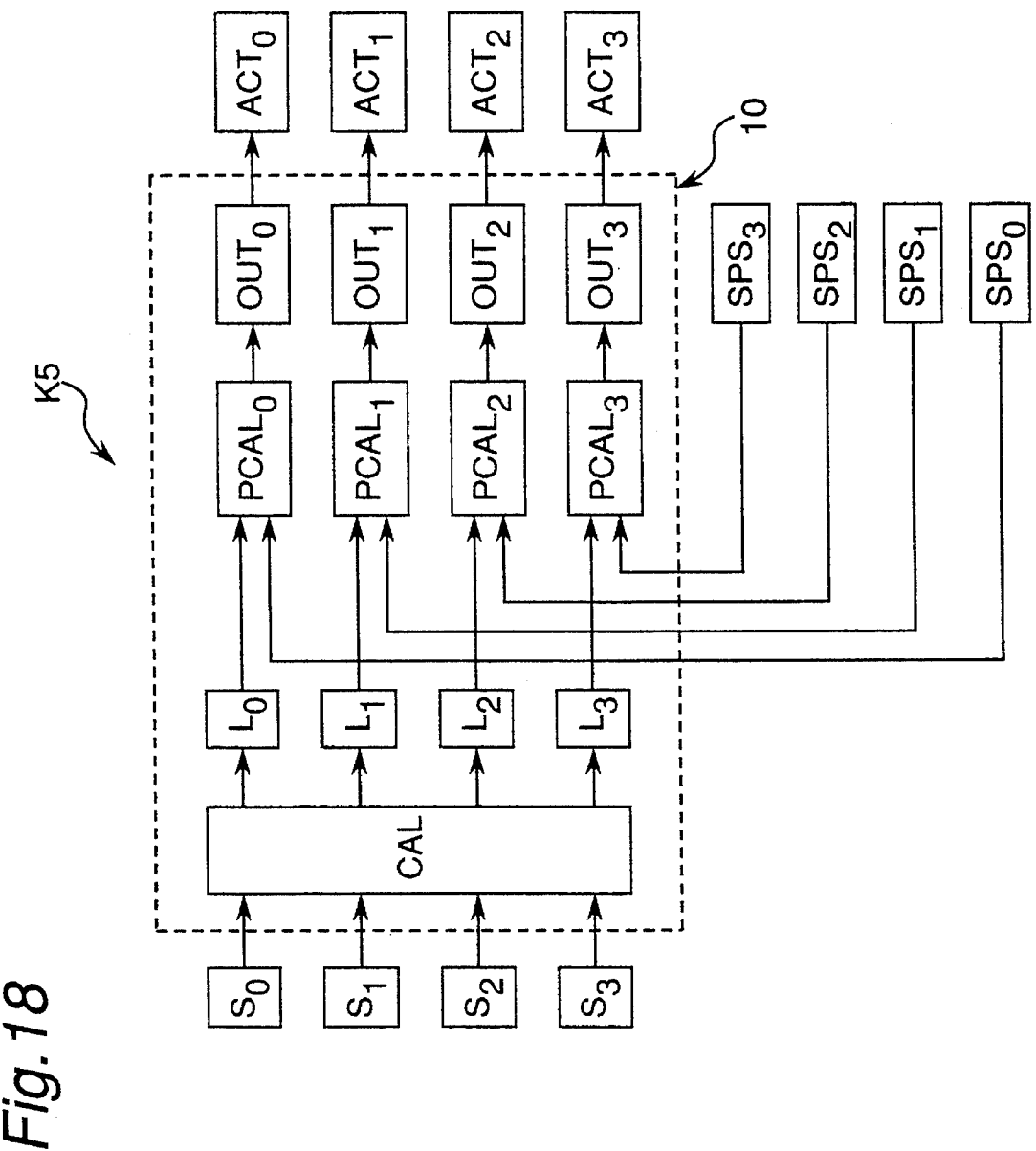
FIG. 18 is a schematic block diagram of the antiskid control device of FIG. 17.

In the fourth embodiment, each of the differential pressure switches $PSW_0$ to $PSW_4$ is an ON-OFF type switch acting as a differential pressure gauge. FIGS. 17 and 18 show an antiskid control device K5 according to a fifth embodiment of the present invention. In the antiskid control device K5, the differential pressure switches $PSW_0$ to $PSW_3$ of the fourth embodiment are, respectively, replaced by differential pressure sensors $SPS_0$, $SPS_1$, $SPS_2$ and $SPS_3$ acting as linear sensors. The differential pressure sensors $SPS_0$ to $SPS_3$ are arranged to detect whether or not a difference between the fluid pressure of the master cylinder 1 and the fluid pressure of each of the wheel cylinders 2A to 2D, is in the vicinity of zero. Meanwhile, when an output of each of the differential pressure sensors $SPS_0$ to $SPS_3$ is less than a predetermined threshold value B, the pressure setting portions $PCAL_0$ to $PCAL_3$ judge that the above mentioned pressure difference is in the vicinity of zero. Since other constructions of the antiskid control device K5 are similar to those of the antiskid control device K4, the description thereof is omitted here for the sake of brevity.

Meanwhile, each of the differential pressure sensors $SPS_0$ to $SPS_3$ exhibits a positive property for the pressure difference as described, above but may also exhibit a negative property for the pressure difference. In this case, when the output of each of the differential pressure sensors $SPS_0$ to $SPS_3$ exceeds the predetermined threshold value B, the pressure setting portions $PCAL_0$ to $PCAL_3$ judge that the above mentioned pressure difference is in the vicinity of zero.

Figure 19:
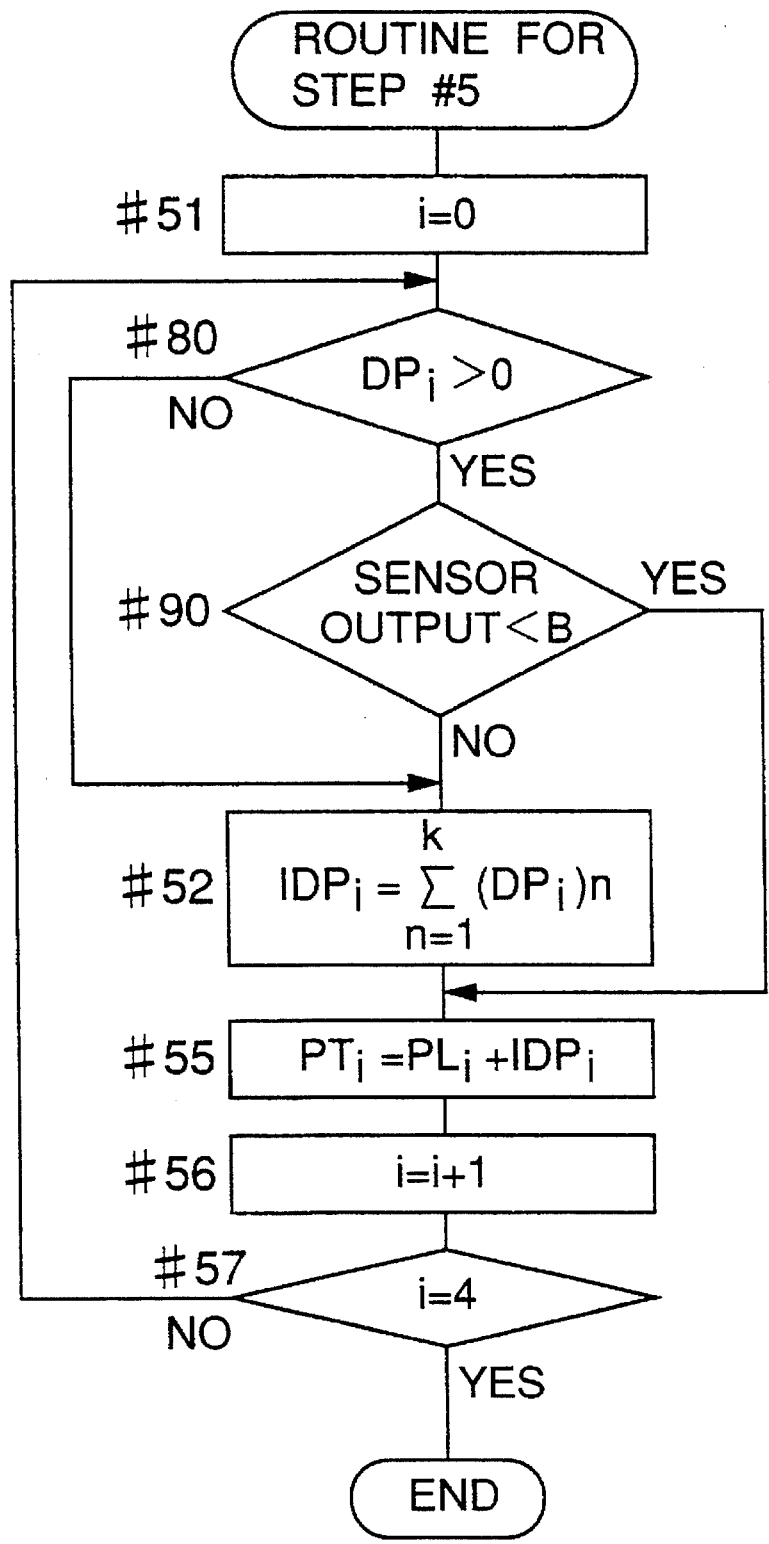
FIG. 19 is a flowchart showing a routine for calculating an estimated brake fluid pressure in each wheel cylinder in operation of the antiskid control device of FIG. 17.

In operation of the antiskid control device K5, the flowchart shown in FIG. 16 for the fourth embodiment is replaced by the flowchart shown in FIG. 19. Therefore, the operation of the antiskid control device K5 is described with reference to the flowchart of FIG. 19, hereinafter. In FIG. 19, process steps which are identical with those of FIG. 16 for the antiskid control device K4, are designated by steps identical with those of FIG. 16. Therefore, in FIG. 19, only process steps which are different from those of FIG. 16 are described here. Meanwhile, also in FIG. 19, processings are performed by the pressure setting portions $PCAL_0$ to $PCAL_3$ unless otherwise specified.

FIG. 19 is different from FIG. 16 only in that step #81 of FIG. 16 is replaced by step #90 in FIG. 19. In FIG. 19, in the case of "YES" at step #80, namely, when the pressure increase or reduction amount $DP_i$ is positive, it is judged at step #90 whether or not signals inputted from the differential pressure sensors $SPS_0$ to $SPS_3$ are less than the predetermined threshold value B. In the case of "YES" at step #90, namely, when the difference between the fluid pressure of the master cylinder 1 and the fluid pressure of each of the wheel cylinders 2A to 2D is in the vicinity of zero, the program flow proceeds to step #55 by skipping step #52.

On the other hand, in the case of "NO" at step #90, namely, when the difference between the fluid pressure of the master cylinder 1 and the fluid pressure of each of the wheel cylinders 2A to 2D is not in the vicinity of zero, the program flow proceeds to step #52.

In accordance with the present invention, when a driver is stepping on a brake pedal so lightly as to possibly cause antiskid control on a road surface on which his motor vehicle is running, not only an extreme increase of estimated brake fluid pressure can be prevented from occurring, owing to the fact that actual fluid pressure of each of the wheel cylinders does not rise so high as a pressure increasing command of brake fluid pressure for a solenoid controlled valve, but such a phenomenon can be prevented in which a pressure reducing command leads to a small brake fluid pressure reducing value suitable for a road surface having higher coefficient of friction, thereby resulting in instability of the vehicle body.

Meanwhile, if the stroke sensor is formed by a plurality of the ON-OFF type switches and the upper limit of the estimated fluid pressure of each of the wheel cylinders is set to the maximum of the predetermined value unless all binary outputs of the switches coincide with one another, it is possible to prevent such a phenomenon in which, by erroneously preventing an extraordinary increase of the estimated brake fluid pressure, a pressure reducing command leads to a large brake fluid pressure reducing value suitable for a road surface having a lower coefficient of friction.

What is claimed is:

1. An antiskid control device which calculates an estimated fluid pressure of each of wheel cylinders under antiskid control in each control cycle so as to adjust a fluid pressure of each of the wheel cylinders on the basis of the estimated fluid pressure and behaviors of wheels, comprising:

a differential pressure detecting means which detects a difference between a fluid pressure of a master cylinder and the fluid pressure of each of the wheel cylinders so as to produce an output signal indicative of the difference between the fluid pressure of the master cylinder and the fluid pressure of each of the wheel cylinders;

wherein when on the basis of the output signal of the differential pressure detecting means the difference between the fluid pressure of the master cylinder and the fluid pressure of each of the wheel cylinders is found to be in the vicinity of zero, the estimated fluid pressure of each of the wheel cylinders is set to a predetermined value by stopping addition in calculation of the estimated fluid pressure.

2. An antiskid control device as claimed in claim 1, wherein the differential pressure detecting means includes a stroke sensor attached to a pedal stroke of a brake pedal and a comparative arithmetic unit for comparing the estimated fluid pressure of each of the wheel cylinders with an upper limit of the estimated fluid pressure of each of the wheel cylinders, which is variably set in accordance with an output signal of the stroke sensor;

wherein when the comparative arithmetic unit has detected that the upper limit of the estimated fluid pressure of each of the wheel cylinders is smaller than the estimated fluid pressure of each of the wheel cylinders, the predetermined value is the upper limit of the estimated fluid pressure of each of the wheel cylinders.

3. An antiskid control device as claimed in claim 2, wherein the stroke sensor is formed by an on-off type switch and the upper limit of the estimated fluid pressure of each of the wheel cylinders is set as one of discontinuous discrete values in accordance with an output signal of the switch.

4. An antiskid control device as claimed in claim 2, wherein the stroke sensor is formed by a multipoint type switch and the upper limit of the estimated fluid pressure of each of the wheel cylinders is set as one of discontinuous discrete values in accordance with an output signal of the switch.

5. An antiskid control device as claimed in claim 2, wherein the stroke sensor is formed by a linear sensor and the upper limit of the estimated fluid pressure of each of the wheel cylinders is set as a continuously variable value in accordance with a continuously variable output signal of the linear sensor.

6. An antiskid control device as claimed in claim 2, wherein the stroke sensor is formed by a plurality of on-off type switches;

wherein unless all binary outputs of the switches coincide with one another, the upper limit of the estimated fluid pressure of each of the wheel cylinders is set to a maximum of the predetermined value.

7. An antiskid control device as claimed in claim 1, wherein the differential pressure detecting means is formed by a differential pressure sensor for directly detecting the difference between the fluid pressure of the master cylinder and the fluid pressure of each of the wheel cylinders;

wherein when the differential pressure sensor has detected that the difference between the fluid pressure of the master cylinder and the fluid pressure of each of the wheel cylinders is in the vicinity of zero, the predetermined value is the estimated fluid pressure of each of the wheel cylinders, which was calculated in a previous control cycle.

* * * * *

UNITED STATES PATENT AND TRADEMARK OFFICE
CERTIFICATE OF CORRECTION

PATENT NO.   : 5,545,929
DATED        : August 13, 1996
INVENTOR(S)  : H. FUJIOKA et al.

It is certified that error appears in the above-indentified patent and that said Letters Patent is hereby corrected as shown below:

On the cover page:   , in section [75], "Inventors", line 1, change "Fijioka" to ---Fujioka---.

Signed and Sealed this

Twenty-seventh Day of May, 1997

Attest:

BRUCE LEHMAN

Attesting Officer

Commissioner of Patents and Trademarks